(12) United States Patent
Yoshihara

(10) Patent No.: US 7,278,506 B2
(45) Date of Patent: Oct. 9, 2007

(54) SNOW VEHICLE SUSPENSION SYSTEM

(75) Inventor: Masanori Yoshihara, Iwata (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 0 days.

(21) Appl. No.: 10/744,611

(22) Filed: Dec. 22, 2003

(65) Prior Publication Data
US 2004/0195023 A1 Oct. 7, 2004

(30) Foreign Application Priority Data
Dec. 26, 2002 (JP) .............................. 2002-378019
Sep. 17, 2003 (JP) .............................. 2003-324721

(51) Int. Cl.
B62D 55/00 (2006.01)
B62M 27/02 (2006.01)

(52) U.S. Cl. ...................... 180/193; 180/9.54; 180/190

(58) Field of Classification Search ................ 180/190, 180/193, 9.25, 9.5, 9.52, 9.54, 9.56
See application file for complete search history.

(56) References Cited

U.S. PATENT DOCUMENTS

| 3,613,811 | A | 10/1971 | Brandli |
| 3,721,308 | A | 3/1973 | Brandli et al. |
| 3,773,126 | A | 11/1973 | Irvine |
| 3,784,263 | A | 1/1974 | Hendrickson et al. |
| 3,788,412 | A | 1/1974 | Vincent |
| 3,863,727 | A | 2/1975 | Michrina |
| 4,133,400 | A | 1/1979 | Shiraishi |
| 4,284,161 | A * | 8/1981 | Blass .......................... 180/184 |
| 4,301,884 | A * | 11/1981 | Taylor ......................... 180/190 |
| 4,305,476 | A | 12/1981 | Blass et al. |
| 4,314,618 | A | 2/1982 | Tamura |
| 4,407,386 | A | 10/1983 | Yasui et al. |
| 4,462,480 | A | 7/1984 | Yasui et al. |
| 4,518,056 | A | 5/1985 | Kobayashi |

(Continued)

FOREIGN PATENT DOCUMENTS

CA 2298749 10/2001

(Continued)

OTHER PUBLICATIONS

U.S. Appl. No. 10/745,301, filed on Dec. 22, 2003, by Takahiko et al.

(Continued)

Primary Examiner—Lesley D. Morris
Assistant Examiner—Marc A. Scharich
(74) Attorney, Agent, or Firm—Knobbe Martens Olson & Bear LLP

(57) ABSTRACT

A vehicle comprises a frame and a slide rail pivotally coupled to the frame. A spring member urges the slide rail in a direction away from the frame. The spring member has a first portion mounted to the frame and a second portion supported on the slide rail at a first spring support position in a first configuration. A spring support is coupled to the vehicle at a second spring support position and is arranged to engage the spring member upon deflection of the slide rail in a second configuration. The vehicle suspension system becomes increasingly stiffer as the deflection of the slide rail increases, to contribute to a more comfortable ride and to reduce the risk of bottoming-out.

42 Claims, 36 Drawing Sheets

U.S. PATENT DOCUMENTS

| | | | |
|---|---|---|---|
| 4,591,173 | A | 5/1986 | Marier |
| 4,892,164 | A | 1/1990 | Yasui et al. |
| 4,892,165 | A | 1/1990 | Yasui et al. |
| 4,917,207 | A | 4/1990 | Yasui et al. |
| 5,060,745 | A | 10/1991 | Yasui et al. |
| 5,265,692 | A | 11/1993 | Mallette |
| 5,586,614 | A | 12/1996 | Kouchi et al. |
| 5,660,245 | A | 8/1997 | Marier et al. |
| 5,667,031 | A | 9/1997 | Karpik |
| 5,692,579 | A | 12/1997 | Peppel et al. |
| 5,727,643 | A | 3/1998 | Kawano |
| 5,730,242 | A | 3/1998 | Furusawa |
| 5,904,216 | A | 5/1999 | Furusawa |
| 5,944,134 | A * | 8/1999 | Peppel et al. ............... 180/193 |
| 5,947,220 | A | 9/1999 | Oka et al. |
| 6,109,382 | A | 8/2000 | Kubota |
| 6,161,908 | A | 12/2000 | Takayama et al. |
| 6,206,124 | B1 * | 3/2001 | Mallette et al. ............. 180/193 |
| 6,234,264 | B1 | 5/2001 | Boivin et al. |
| 6,283,241 | B1 | 9/2001 | Kubota |
| 6,354,391 | B1 | 3/2002 | Cormican |
| 6,450,279 | B1 | 9/2002 | Imamura |
| 6,450,280 | B1 | 9/2002 | Pepka et al. ............... 180/193 |
| 6,478,098 | B2 * | 11/2002 | Boivin et al. .............. 180/9.52 |
| 6,631,778 | B2 * | 10/2003 | Mallette ..................... 180/193 |

FOREIGN PATENT DOCUMENTS

| | | |
|---|---|---|
| EP | 1312538 A1 | 5/2003 |
| EP | 1336557 A2 | 8/2003 |
| JP | 54-051134 | 4/1979 |
| JP | 55-019648 | 2/1980 |
| JP | 55-022537 | 2/1980 |
| JP | 55-099475 | 7/1980 |
| JP | 55-156770 | 12/1980 |
| JP | 56-034577 | 4/1981 |
| JP | 56-079065 | 6/1981 |
| JP | 58-026684 | 2/1983 |
| JP | 03-157283 | 7/1991 |
| JP | 03-276888 | 12/1991 |
| JP | 08-207838 | 8/1996 |
| JP | 09-142344 | 6/1997 |
| JP | 10-100981 | 4/1998 |
| WO | WO99/474111 | 9/1999 |

OTHER PUBLICATIONS

U.S. Appl. No. 10/745,397, filed on Dec. 22, 2003, by Masanori Yoshihara.

European Search Report, May 27, 2004.

\* cited by examiner $$F = F_F \cos \beta + F_R \cos \gamma = k(\theta - \theta_0) \left( \frac{\cos \beta}{L_1} + \frac{L_2'}{L_3 L_2} \cos \alpha \cdot \cos \gamma \right)$$

SNOW VEHICLE SUSPENSION SYSTEM

RELATED APPLICATIONS

This application is based upon and claims the priority of Japanese Patent Application No. 2002-378019, filed on Dec. 26, 2002, and Japanese Patent Application No. 2003-324721, filed on Sep. 17, 2003, which are hereby incorporated by reference in their entireties.

BACKGROUND OF THE INVENTION

1. Field of the Invention

The present application generally relates to suspension systems. More specifically, the present application relates to a suspension system for snow vehicles.

2. Description of the Related Art

A typical snow vehicle is designed to run on uneven snow surfaces and is thus provided with a suspension device for absorbing shocks caused by the unevenness of the snow surfaces.

Some suspension devices have a torsion spring for reducing shocks transmitted to the vehicle. An extendable shock absorber is also interposed between a body frame and the slide rail. One example of a suspension device is disclosed in Canada Patent No. 2,298,749. The suspension device with the torsion spring has a generally linear spring reaction characteristic. For example, the spring reaction increases generally linearly with the increase of the deflection of the slide rail. Thus, when a torsion spring with a relatively smaller spring constant is selected, in order to improve riding comfort, the vehicle tends to bottom-out when it encounters a relatively large bump. When a torsion spring with a relatively larger spring constant is selected, bottoming-out can be inhibited, but the suspension system is stiff and uncomfortable for the user. Ultimately, the spring reaction characteristic cannot be changed depending upon the user's preference.

In some suspension devices, one end of a torsion spring is supported on the slide rail and the other on the body. A tensioning block is disposed on the side of the slide rail to change the operation of the torsion spring. One example of a suspension device is disclosed in U.S. Pat. No. 6,354,391 B1. When the deflection of the slide rail increases beyond a prescribed amount, the spring reaction significantly increases. However, the spring reaction characteristic cannot be changed depending upon the user's preference.

SUMMARY OF THE INVENTION

One aspect of the invention disclosed herein includes the realization that snow vehicle suspension systems can be improved to provide a more comfortable ride and to reduce bottoming-out of the shock absorbers where the spring reaction characteristic of the suspension system gets progressively larger as the amount of deflection of the slide rail increases. In some embodiments, the spring reaction characteristic can be changed depending upon the user's preference.

Thus, in accordance with another aspect of the invention disclosed herein, a vehicle comprises a frame. A slide rail is disposed below the frame for guiding a drive track along a road surface. The slide rail is pivotally coupled to the frame. A spring member urges the slide rail in a direction away from the frame. The spring member has a first portion mounted to the frame and a second portion supported on the slide rail at a first spring support position in a first configuration. At least one spring support is coupled to the vehicle at a second spring support position. The spring support is arranged to engage the spring member upon deflection of the slide rail such that the spring member is supported by the spring support at the second spring support position in a second configuration.

In still another aspect, a vehicle comprises a frame. A slide rail is pivotally coupled to the frame. A torsion spring has a first portion mounted to the frame and a second portion that extends from the first portion generally toward the slide rail. The vehicle comprises a first means for supporting the second portion of the spring member at a first spring support location. The vehicle comprises a second means for supporting the second portion of the spring member at a second spring support location.

In yet another aspect, a vehicle comprises a frame. A slide rail is pivotally coupled to the frame. The vehicle comprises means for producing a non-linear spring reaction force opposing motion of the slide rail toward the frame.

In another aspect, a vehicle has a frame. A slide rail is pivotally coupled to the frame. A spring member has a first portion mounted to the frame and a second portion supported on the slide rail at a first spring support position in a first configuration. At least one spring support is coupled to the vehicle at a second spring support position. The spring support is arranged to engage a third portion of the spring member upon deflection of the slide rail in a second configuration. The method of operation of the vehicle comprising the step of deflecting the slide rail within a first range, wherein the second portion of the spring member is supported at the first spring support position. The method additionally comprising the step of deflecting the slide rail within a second range, wherein the second spring support member engages the third portion of the spring support member at the second spring support position.

BRIEF DESCRIPTION OF THE DRAWINGS

These and other features, aspects and advantages of the present invention will be better understood with reference to preferred embodiments, which are illustrated in the accompanying drawings. The illustrated embodiments are merely exemplary and are not intended to limit the scope of the present invention.

DETAILED DESCRIPTION OF THE PREFERRED EMBODIMENT

Figure 1:
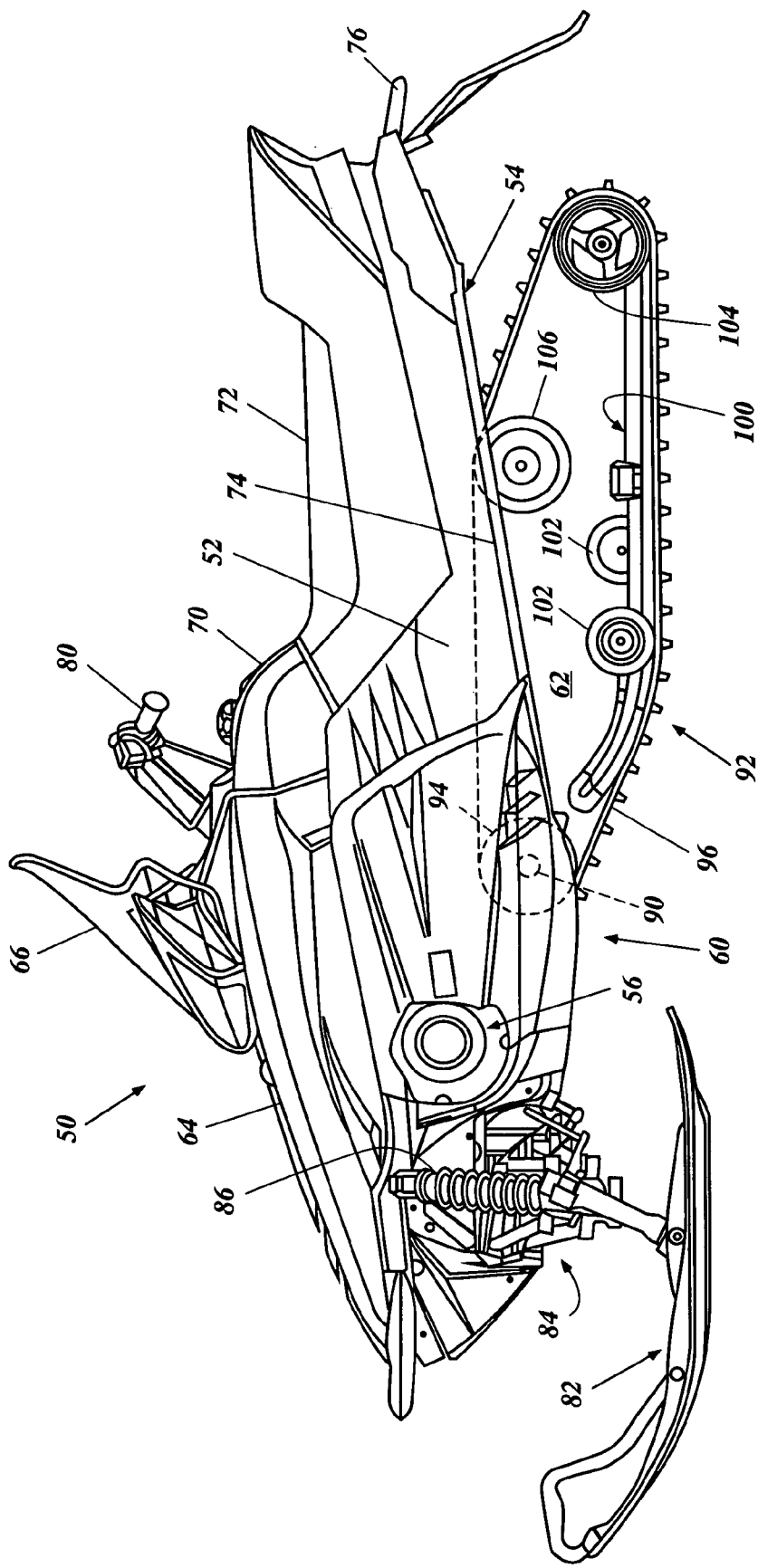
FIG. 1 is a side elevational view of a snow vehicle according to one embodiment of the present invention.

With reference to FIG. 1, a snow vehicle having certain features, aspects and advantages of the present invention is described below. A snow vehicle represents an application for which many features, aspects and advantages of the present invention provide particular advantages. Nevertheless, certain features, aspects and advantages of the present invention can be used with other types of vehicles.

As shown in FIG. 1, the vehicle 50 comprises a vehicle body 52, including a body frame 54, an engine 56 mounted to the vehicle body 52, and a drive system 60 coupled with a rear suspension system 62 mounted to the body frame 54.

The vehicle body 52 carries a number of other components of the vehicle 50. For example, a vehicle body cover 64 is disposed over the vehicle body 52. The vehicle body cover 64 defines, in part, an engine compartment in which the engine 56 is mounted.

A windshield 66 is disposed over a mid-portion of the vehicle body cover 64. Rearward of the windshield 66, a fuel tank 70 is mounted to the vehicle body 52 in a manner that allows the vehicle body cover 64 and the fuel tank 70 to appear to blend together. A seat 72 is mounted to the vehicle body 52, rearward of the fuel tank 70. The seat 72 preferably is a saddle-type seat. Footrests 74 for supporting the rider's feet are formed on the body frame 54 on both right and left sides of the vehicle 50 below the seat 72.

A grab bar 76 is disposed rearward from the seat 72. The grab bar 76 comprises a grabbing portion that can be used to raise a rear portion of the vehicle 50 for turning and maneuvering when the vehicle 50 is not being ridden. The illustrated grab bar 76 is generally U-shaped and is mounted in a generally horizontal manner. However, other forms of grab bars can be used.

A steering handle assembly 80 is disposed forward of the seat 72 and the fuel tank 70. The steering handle assembly 80 can carry appropriate controls and can be coupled to a pair of front skis 82. Manipulation of the steering handle assembly 80 causes the direction of the vehicle 50 to be altered. The front skis 82 are mounted to the vehicle body 52 through a front suspension assembly 84. Any suitable front suspension assembly 84 can be used. The front suspension assembly 84 preferably comprises front ski shock absorbers 86.

The engine 56 in the illustrated arrangement is a four-cycle, multi-cylinder engine mounted within the engine compartment. Of course, other types and sizes of engines can be used. The engine 56 has an engine body that is supported on the vehicle body 52. An intake system is configured to introduce air and fuel into the engine body. In the illustrated embodiment, the intake system comprises an air filter and a carburetor. A fuel injection system could be used instead to produce the fuel charge. An exhaust system is configured to discharge exhaust gases to the atmosphere after combustion in the engine. The exhaust system comprises exhaust pipes and a muffler.

The engine 56 drives a transmission system (not shown), which preferably is a continuously variable transmission. Other transmissions can also be used. The transmission system is coupled with the drive system 60. The drive system 60 comprises a drive shaft 90 coupled with the transmission system. The drive shaft 90 powers a drive track 92. The drive track 92 generally comprises one or more drive wheels 94 and a track belt 96. The drive wheel 94 provides a motive force to the track belt 96 which is commonly used in the snow vehicle industry.

With continued reference to FIG. 1, the track belt 96 is guided around a preferred path on a slide rail assembly 100, lower guide wheels 102, and rear suspension wheels 104. The slide rail assembly 100 preferably supports the lower guide wheels 102 and the rear suspension wheels 104. Upper guide wheels 106 preferably are mounted to the vehicle body 52 and are configured to help define the path for the track belt 96. The rear suspension system 62 mounts these components to the vehicle body 52. The rear suspension system 62 will be described in greater detail below.

Many of the above-described components are generally conventional and can be arranged and configured in any suitable manner. Additionally, the above-described components can be replaced by other suitable components where desired. Any details omitted to this point have been considered well within the design knowledge of those of ordinary skill in the art.

Figure 2:
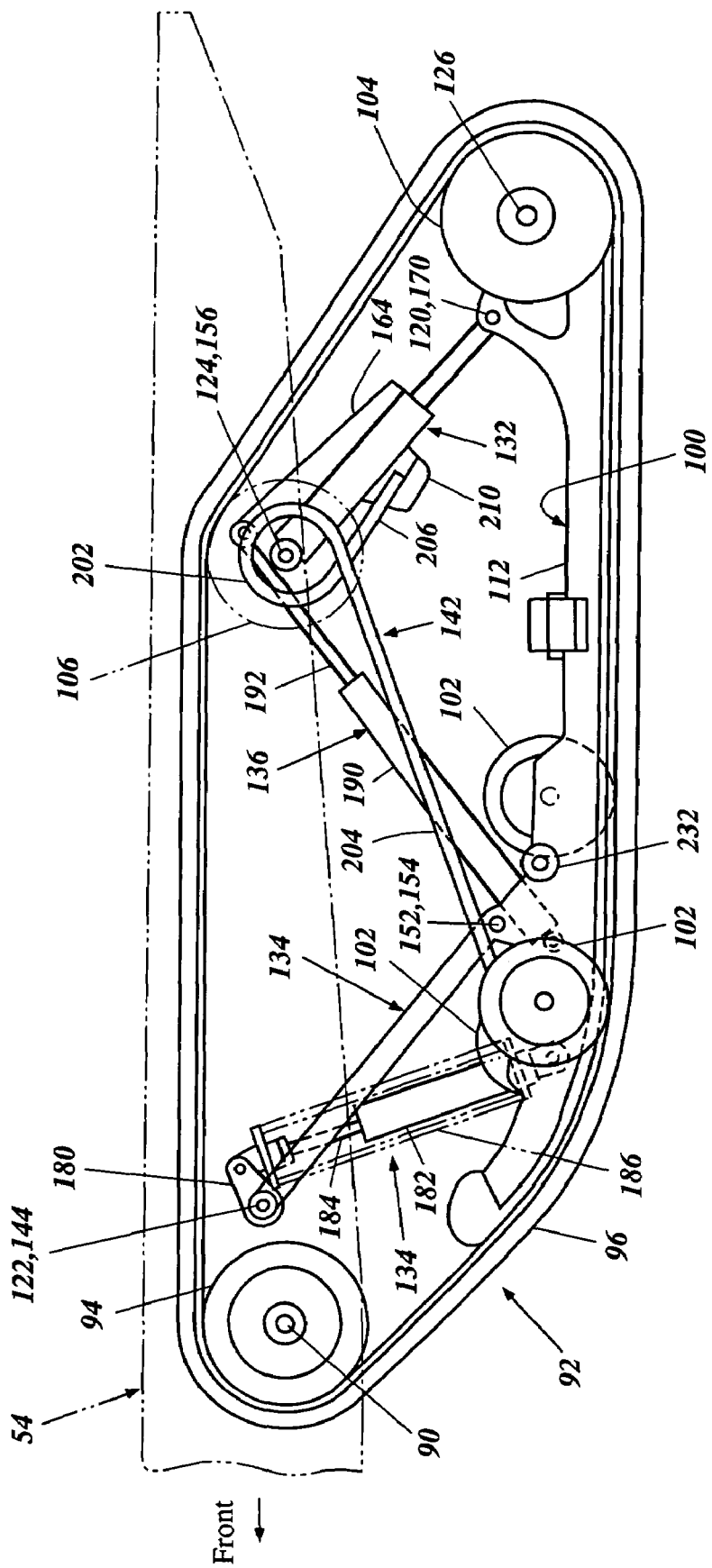
FIG. 2 is a side elevational view of a suspension and drive assembly of the vehicle of FIG. 1.
Figure 3:
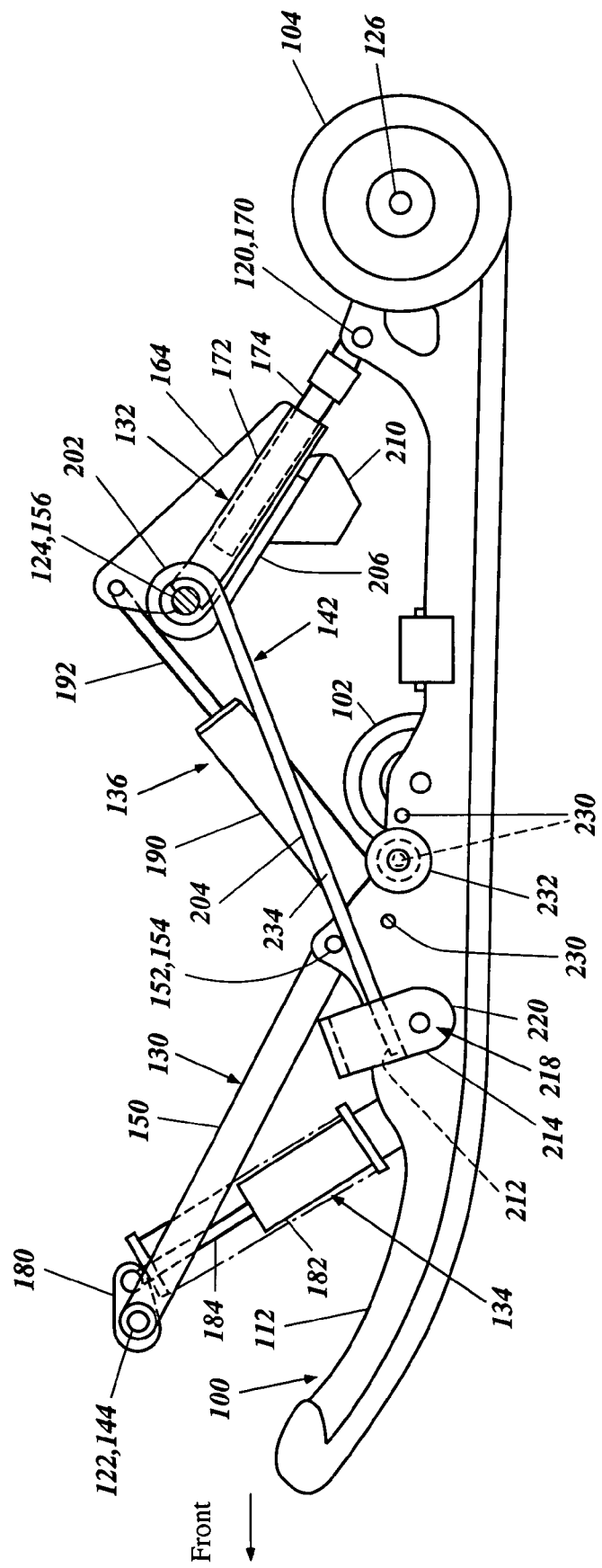
FIG. 3 is a side elevational view of the suspension system of the assembly shown in FIG. 2.
Figure 4:
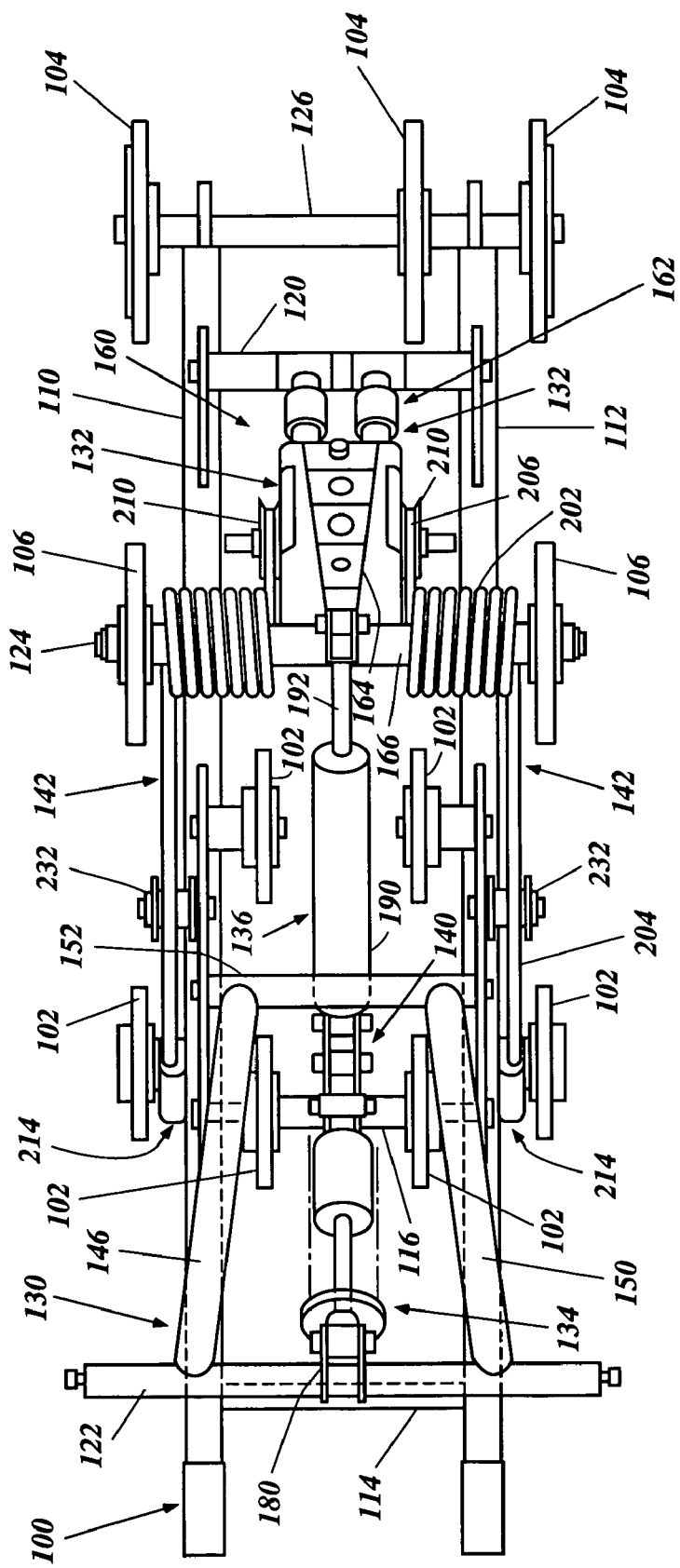
FIG. 4 is a plan view of the suspension system of FIG. 3.

FIGS. 2-8 further illustrate portions of the rear suspension assembly for the snow vehicle of FIG. 1. With reference to FIGS. 2-4, the drive track 92 is located toward the rear of the body frame 54. The drive track 92 comprises the track belt 96 extending around the drive wheel 94, the slide rail assembly 100, the lower guide wheels 102 and the upper guide wheels 106. The drive track 92 has a generally parallelogram shape when viewed from a side. To drive the snow vehicle 50, the engine 56 drives the drive shaft 90 of the drive wheel 94 to rotate the track belt 96 of the drive track 92. The snow vehicle 50 can be guided by pivoting the front skis 82 through operation of the steering handle assembly 80.

The slide rail assembly 100 guides the track belt 96 along a snow surface. The slide rail assembly 100 comprises a right side rail 110 and a left side rail 112. The right and left side rails 110, 112 extend in the longitudinal direction of the vehicle 50. The slide rail assembly 100 also comprises a front cross shaft 114; an intermediate cross shaft 116, and a rear cross shaft 120. The front, intermediate, and rear cross shafts 114, 116, 120 extend laterally between the right side rail 110 and the left side rail 112. Pairs of right and left lower guide wheels 102 are pivotally supported on the slide rail assembly 100 for guiding and supporting a lower part of the track belt 96.

An upper arm shaft 122 extends laterally from one side of the body frame 54 to another near the front of the vehicle 50. A first wheel shaft 124 extends laterally from one side of the body frame 54 to another near the rear of the vehicle 50. The right and left upper guide wheels 106 are rotatably mounted on the first wheel shaft 124, which is secured to the body frame 94. The rear suspension wheels 104 are mounted on a second wheel shaft 126 disposed at the rear ends of the right and left side rails 110, 112. The rear suspension wheels 104 are adjustable in the longitudinal direction.

The rear suspension system 62 is interposed between the body frame 54 and the slide rail assembly 100. The suspension system 62 comprises a front suspension arm 130 for pivotally supporting the slide rail assembly 100. The suspension system 62 can comprise a rear sliding arm 132. The suspension system 62 can also comprise front and rear shock absorbers 134, 136 for reducing the impact forces caused by variations in the travel surface and for absorbing vehicle vibrations. The suspension system 62 preferably comprises a linkage mechanism 140 coupling front and rear shock absorbers 134, 136 with the slide rail assembly 100. The suspension system 62 can also include spring members, such as, for example, a pair of right and left torsion springs 142. The suspension system 62 will be described in more detail below.

The front suspension arm 130 is coupled to the body frame 54 at a front frame coupling location 144. Preferably, the front suspension arm 130 is coupled to the body frame 54 via the upper arm shaft 122 at the front frame coupling location 144. The front suspension arm 120 extends generally rearward and downward from the front frame coupling location 144. The front suspension arm 130 comprises right and left front suspension arm members 146, 150. The front suspension arm 130 also comprises upper and lower arm shafts 122, 152 that extend laterally across the width of the vehicle 50. The upper arm shaft 122 is coupled to the upper ends of the right and left front suspension arm members 146, 150. The upper arm shaft 122 preferably is welded to the upper ends of the right and left front suspension arm members 146, 150. The lower arm shaft 152 is coupled to the lower ends of the right and left front suspension arm members 146, 150. The lower arm shaft 152 preferably is welded to the lower ends of the right and left front suspension arm members 146, 150. The front suspension arm 130 preferably has a generally trapezoid shaped configuration. The upper arm shaft 122 of the front suspension arm 130 is pivotally coupled to the body frame at the front frame coupling location 144. The lower arm shaft 152 of the front suspension arm 130 is pivotally coupled to the slide rail assembly 100 at a front rail coupling location 154.

The rear sliding arm 132 is coupled to the body frame 54 at a rear frame coupling location 156. Preferably, the rear sliding arm 132 is coupled to the body frame 54 via the first wheel shaft 124 at the rear frame coupling location 156. The rear sliding arm 132 extends generally rearward and downward from the rear frame coupling location 156. The rear sliding arm 132 comprises right and left rear sliding arm members 160, 162. The right and left rear sliding arm members 160, 162 are arranged side by side and are disposed generally parallel to the front suspension arm 130. The right and left rear sliding arm members 160, 162 are coupled together via a supporting bracket 164 to enhance torsional rigidity about their axes. In the illustrated embodiment, the rear sliding arm 132 is pivotally coupled to the body frame 54 at the rear frame coupling location 156 via a sleeve 166 rotatably coupled with the first wheel shaft 124. The rear sliding arm 132 is pivotally coupled to the slide rail assembly 100 at a rear rail coupling location 170 via the rear cross shaft 120.

Figure 5:
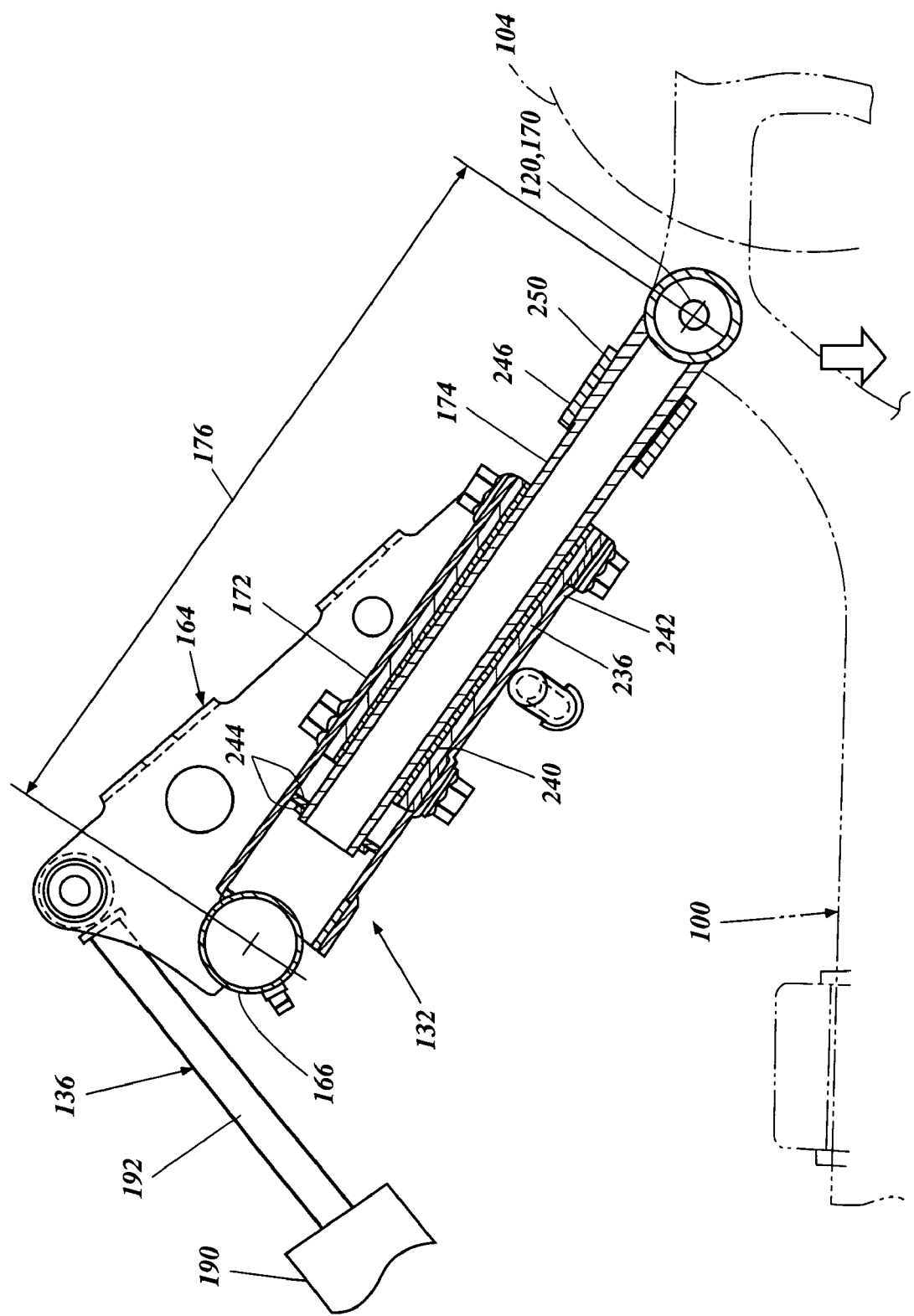
FIG. 5 is a sectional side view of a rear sliding arm of the suspension system of FIG. 3.

With reference to FIG. 5, the right and left rear sliding arm members 160, 162 each comprise a cylindrical member 172 and a cylindrical sliding shaft 174 coupled with the cylindrical member 172. The cylindrical member 172 and the cylindrical sliding shaft 174 are configured for relative movement along their longitudinal axes. The cylindrical member 172 and the cylindrical sliding shaft 174 move relative each other as the slide rail assembly 100 is deflected. The deflection of the slide rail assembly 100 causes relative movement of the cylindrical member 172 and the cylindrical sliding shaft 174 such that an arm length 176, of the rear sliding arm 132, is varied according to the deflection of the slide rail assembly 100. The rear sliding arm 132 is described further below.

With reference to FIGS. 2-4, the front shock absorber 134 is located generally in front of the front suspension arm 130. The front shock absorber 134 is coupled with the upper arm shaft 122 of the front suspension arm 130 via a coupling member. The coupling member preferably is a coupling bracket 180. The front shock absorber 134 extends generally rearward and downward from the upper arm shaft 122 of the front suspension arm 130. In the illustrated embodiment, the front shock absorber 134 comprises a cylinder 182 containing hydraulic oil, a rod 184 slidably coupled with the cylinder 182 via a damping mechanism (not shown), and a coil spring 186 interposed between the rod 184 and the cylinder 182. An upper end of the rod 184 is pivotally coupled to a first end of the coupling bracket 180. The coupling bracket 180 is fixed to the upper arm shaft 122. The first end of the coupling bracket 180 is oriented toward the rear of the vehicle 50 relative the upper arm shaft 122. A lower end of the front shock absorber 134 preferably is coupled to the slide rail assembly 100 through the linkage mechanism 140 as will be described below.

The rear shock absorber 136 is located generally behind the front suspension arm 130 and generally in front of the rear sliding arm 132. In the illustrated embodiment, a lower end of the rear shock absorber 136 is coupled to the lower end of the front shock absorber 134 and the slide rail assembly 100 through the linkage mechanism 140. The linkage mechanism 140 will be described further below. In the illustrated embodiment, the rear shock absorber 136 extends generally upward from the linkage mechanism 140 toward the rear of the vehicle 50. The rear shock absorber 136 comprises a cylinder 190 containing hydraulic oil, and a rod 192 slidably coupled with the cylinder 190 via a damping mechanism (not shown). An upper end of the rod 192 is pivotally coupled to an upper end of the supporting bracket 164 secured to the right and left rear sliding arms 160, 162. The upper end of the supporting bracket 164 is located generally above the rear frame coupling location 156.

Figure 6:
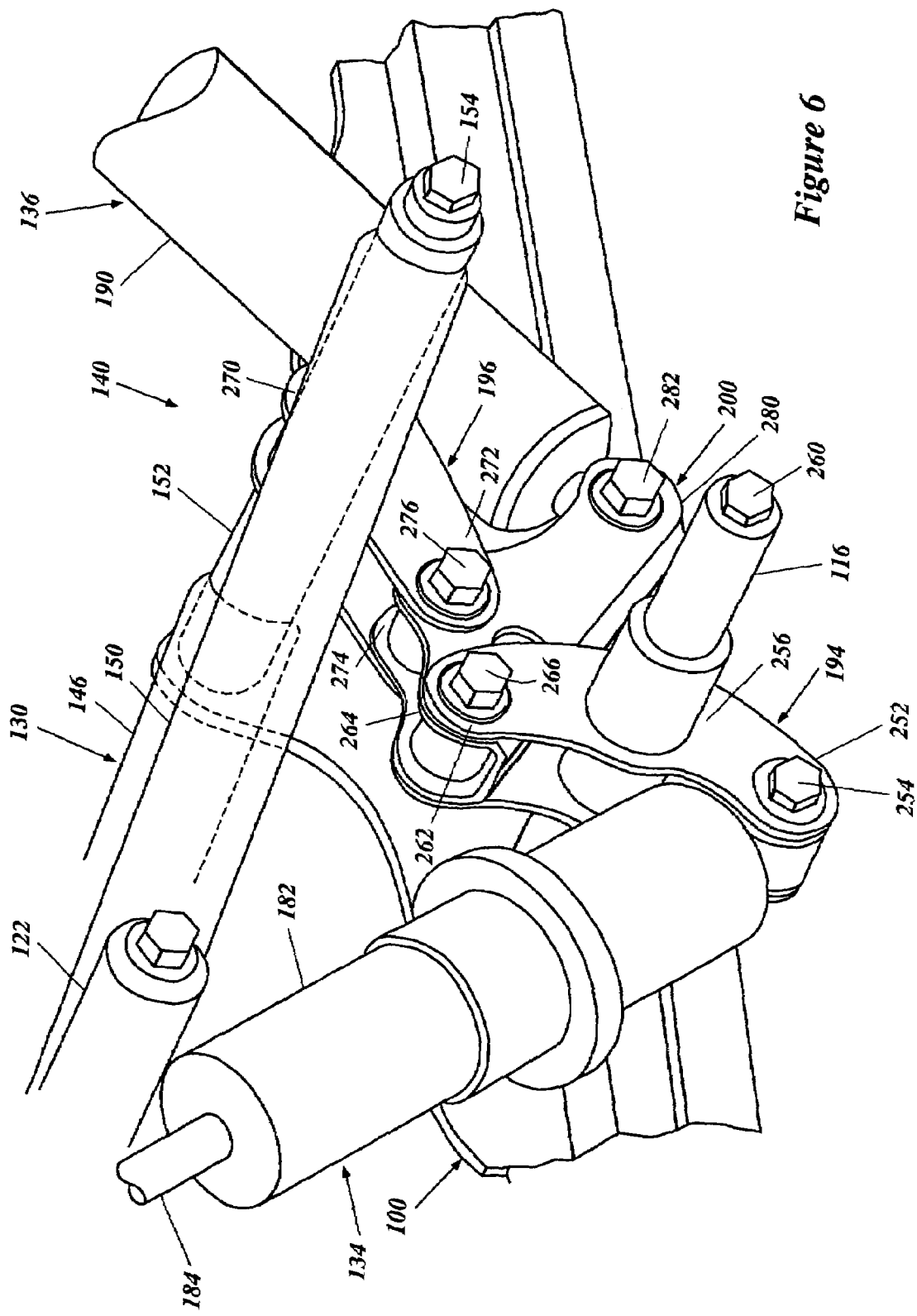
FIG. 6 is a perspective view of a linkage mechanism of the suspension system of FIG. 3.
Figure 7:
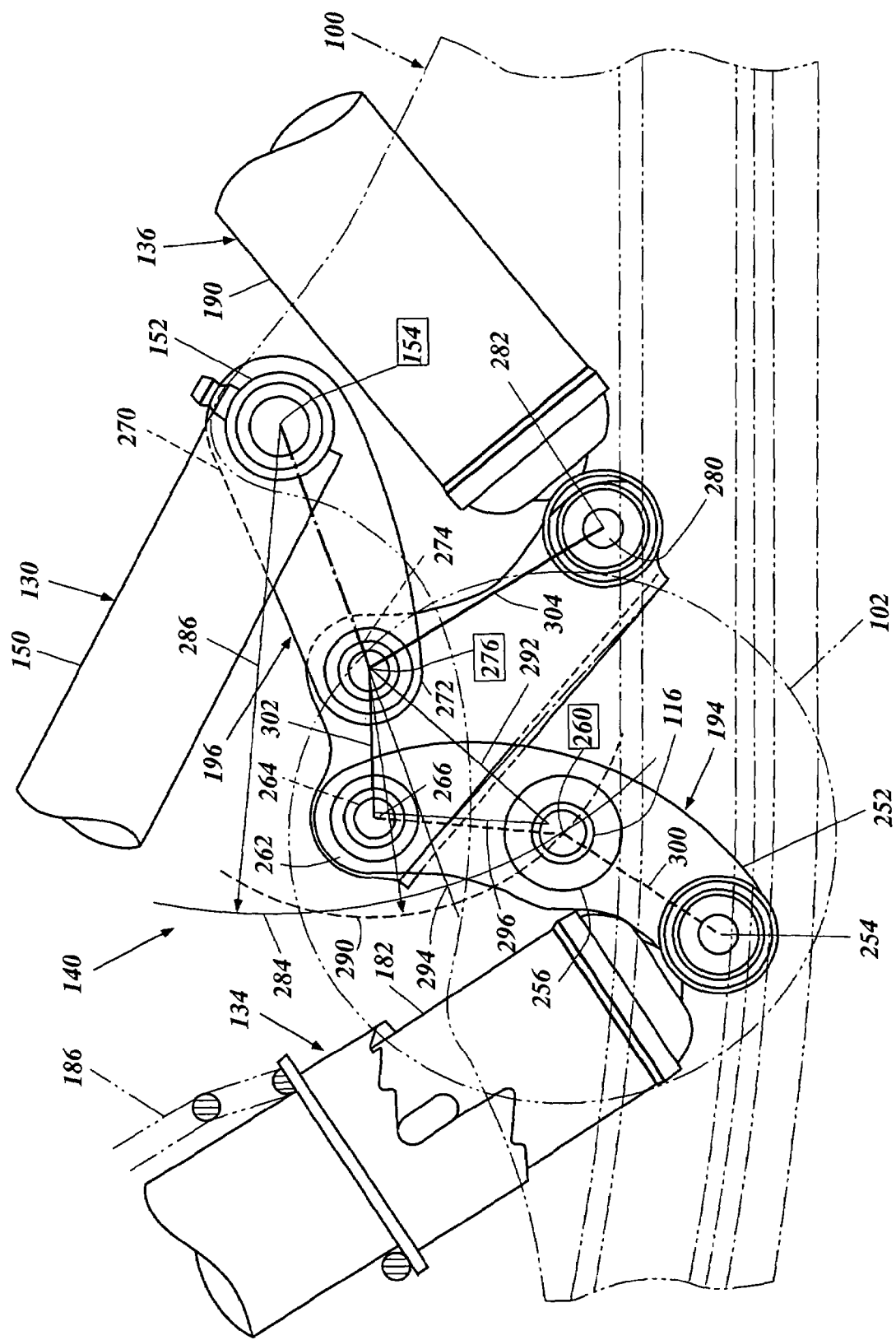
FIG. 7 is a side elevational view of the linkage mechanism of FIG. 6.

With reference to FIGS. 6 and 7, in one embodiment a linkage mechanism 140 comprises a first linkage member 194, a second linkage member 196, and a third linkage member 200. The first linkage member 194 is pivotally coupled to the lower end of the front shock absorber 134 and the intermediate cross shaft 116 of the slide rail assembly 100. The second linkage member 196 is fixed to the lower arm shaft 152 of the front suspension arm 130. The third linkage member 200 is pivotally coupled to the first linkage member 194, to the second linkage member 196, and to the lower end of the rear shock absorber 136. The linkage mechanism 140 is described in more detail below.

As shown in FIGS. 2-4, spring members are located between the body frame 54 and the slide rail assembly 100. The spring members preferably are torsion springs 142. The spring members can also be plate springs. The torsion springs 142 urge the slide rail assembly 100 away from the body frame 54. Each of the torsion springs 142 preferably has a coiled portion 202, a long end portion 204 extending forward from the coiled portion 202, and a short end portion 206 extending rearward from the coiled portion 202. In the illustrated embodiment, the coiled portion 202 of the torsion spring 142 is disposed around the sleeve 166 of the rear sliding arm 132. The short end portion 206 of the torsion spring 142 is supported from below by a bracket 210 secured to a lower side of the rear sliding arm 132.

Figure 8:
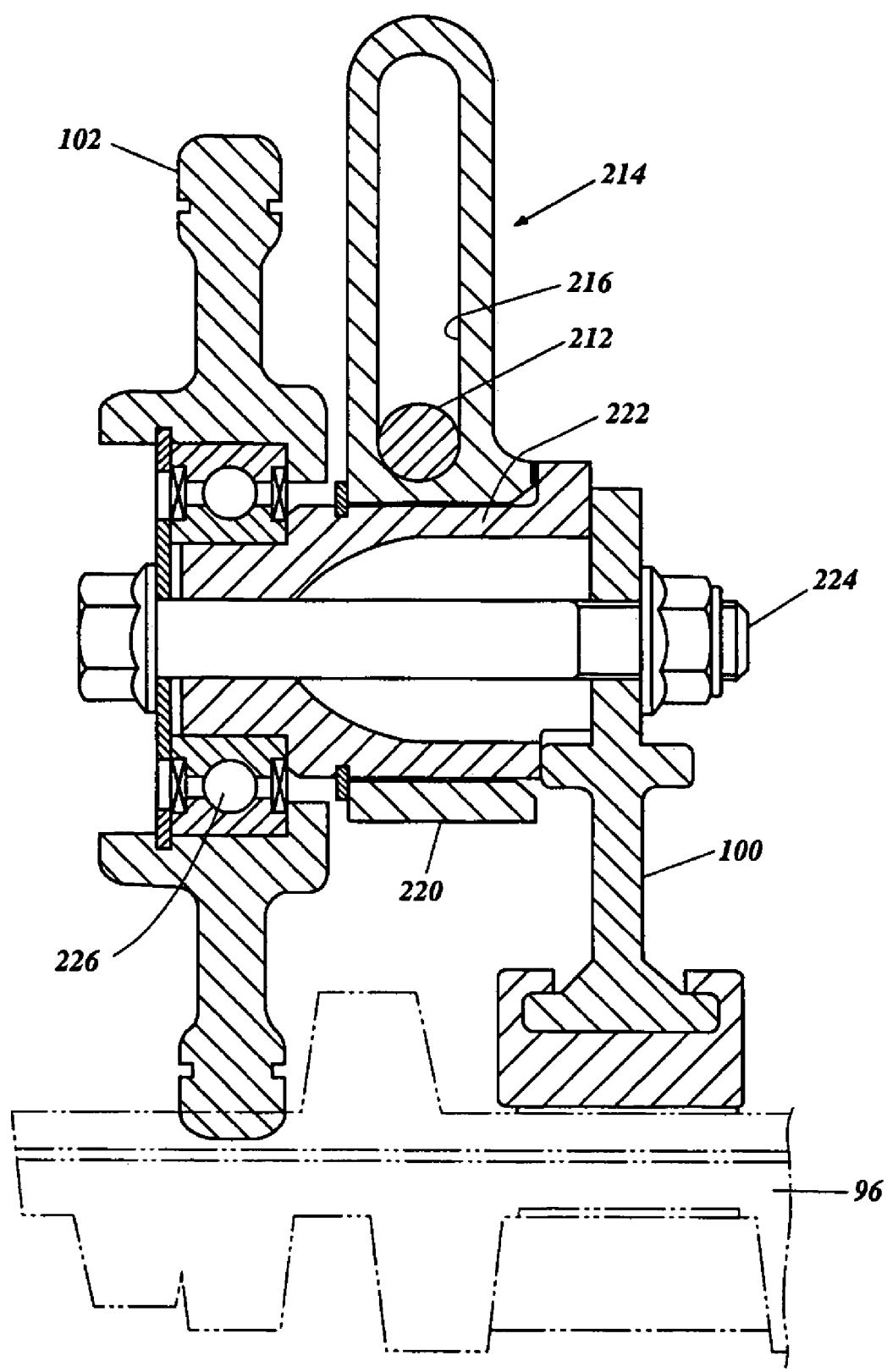
FIG. 8 is a sectional front view of a spring support bracket of the suspension system of FIG. 3.

The long end portion 204 of the torsion spring 142 has an end 212 supported by a spring support bracket 214 attached to the slide rail assembly 100 at a first spring support location 218. As shown in FIG. 8, the spring support bracket 214 in the illustrated embodiment has an ellipsoid shaped support hole 216 having a major axis extending vertically. A lower portion 220 of the spring support bracket 214 is secured to, and supported by, a support shaft 222 of one of the guide wheels 102. The support shaft 222 is secured to the slide rail assembly 100 with a bolt 224. The support shaft 222 rotatably supports the lower guide wheel 102 via bearings 226. The end 212 of the long end portion 204 of the torsion spring 142 is supported by the bottom surface of the support hole 216 with the suspension system in an undeflected state. The end 212 of the long end portion 204 of the torsion spring 142 is movable vertically within the support hole 216.

Figure 9A:
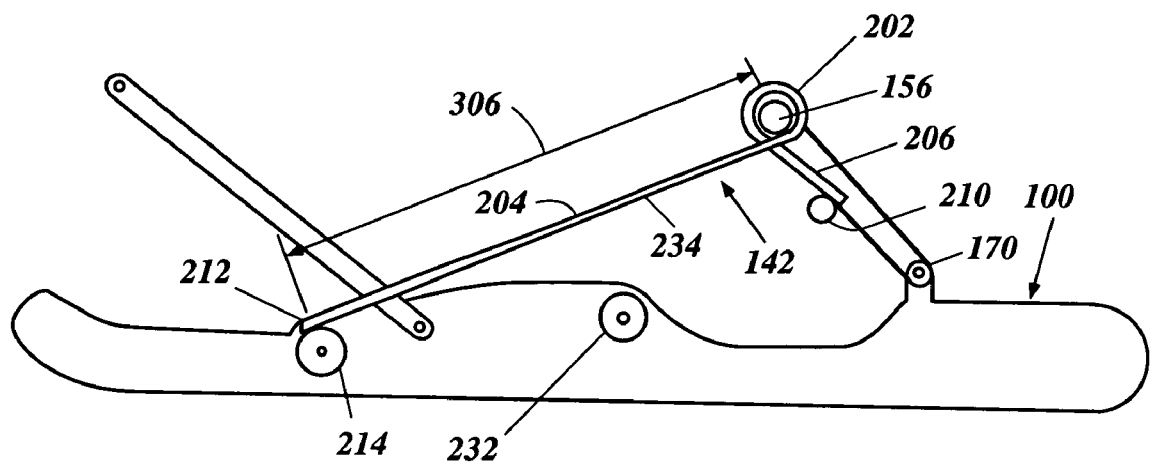
FIGS. 9(*a*), 9(*b*), and 9(*c*) are schematic side views of a torsion spring of the suspension system of FIG. 3.
Figure 9B:
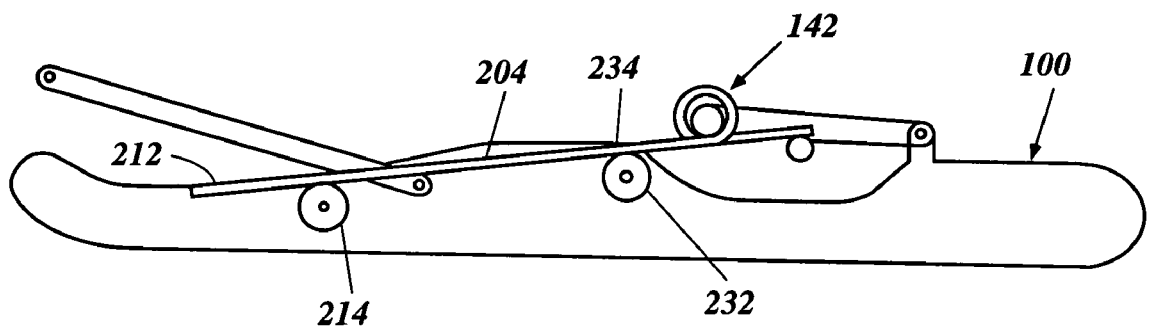
Figure 9C:
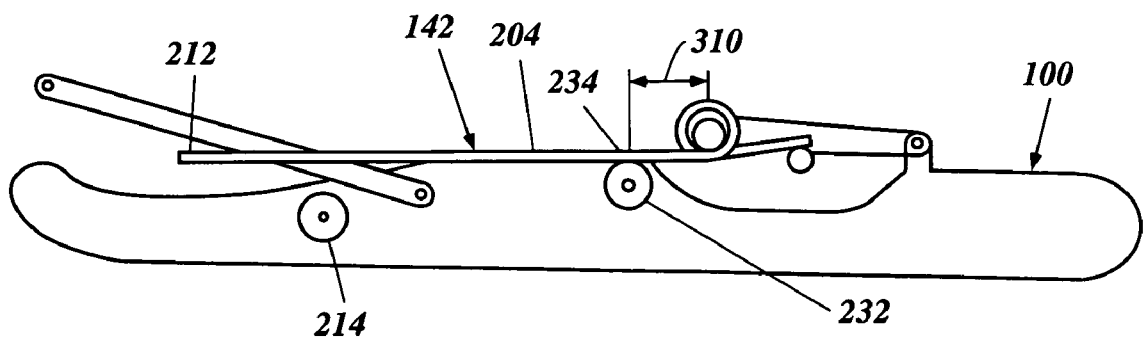

With reference to FIG. 3, each of the right and left side rails 110, 112 in the illustrated embodiment has three openings 230 defined at longitudinally spaced locations. Each opening is located in a position higher than the one located rearward of it. A bobbin-shaped spring support member 232 comprises a circular rod and flanges provided at both ends of the rod. The spring support member 232 can be removably coupled with the slide rail assembly 100. As shown in FIG. 3, the spring support member 232 is coupled with the slide rail assembly 100 at the center opening 230 defined in the slide rail assembly 100. The spring support member 232 is configured to abut the long end portion 204 of the torsion spring 142 at an intermediate spring support location 234 when the slide rail assembly 100 is deflected beyond a prescribed amount. When the snow vehicle 50 passes over a relatively large bump on a snow surface, causing the slide rail assembly 100 to deflect beyond the prescribed amount, the spring support member 232 contacts the long end portion 204 of the torsion spring 142 at the intermediate spring support location 234, as shown in FIG. 9, to change the spring reaction characteristic in a step-like manner as will be described further below.

The spring support member 232 may also be attached in the front or rear opening 230 defined in the slide rail assembly 100 depending upon the user's preference. When the spring support member 232 is located toward the front of the vehicle 50, the variation in spring reaction characteristic is relatively lesser. When the spring support member 232 is located toward the rear of the vehicle 50, the variation in spring reaction characteristic is relatively greater. The spring support member 232 is located in a relatively higher position when the spring support member 232 is coupled to the slide rail assembly 100 at an opening 230 more toward the front of the vehicle 50. Accordingly, the spring support member 232 will contact the long end portion 204 of the torsion spring 142 relatively sooner during a deflection of the slide rail assembly 100. The spring support member 232 is located in a relatively lower position when the spring support member 232 is coupled to the slide rail assembly 100 at an opening 220 more toward the rear of the vehicle 50. The spring support member 232 preferably is located closer to the rear frame coupling location 156. Accordingly, the spring support member 232 will contact the long end portion 204 of the torsion spring 142 relatively later during a deflection of the slide rail assembly 100 and the lever arm of the long end portion will be relatively shorter. The spring members will be described further below.

When the snow vehicle travels over an uneven snow surface causing the slide rail assembly 100 to deflect upward, the slide rail assembly 100 pivots about the front frame coupling location 144, where the front suspension arm 130 is coupled with the body frame 54, and the rear frame coupling location 156, where the rear sliding arm 132 is coupled to the body frame 54. As the vehicle 50 travels, the front and rear shock absorbers 134, 136, and the rear sliding arm 132, extend or contract with the deflection of the slide rail assembly 100. The spring reaction forces and damping forces generated by the extension and contraction of the shock absorbers and rear sliding arm reduce impact forces and absorb vehicle vibrations.

Operation of the Rear Sliding Arm

With reference to FIG. 5, as described above, each of the rear sliding arm members 160, 162 comprises the cylindrical member 172 and the cylindrical sliding shaft 174. The cylindrical member 172 and the cylindrical sliding shaft 174 move relative each other as the slide rail assembly 100 is deflected. The deflection of the slide rail assembly 100 causes the arm length 176 of the rear sliding arm 132 to vary.

The upper ends of the cylindrical members 172 are secured to the rear arm sleeve 166 that is rotatably coupled to the first wheel shaft 124 at the rear frame coupling location 156. The lower ends of the cylindrical sliding shafts 174 are pivotally coupled to the rear cross shaft 120 that extends between the left and right side rails 110, 112. A bushing 236 is coupled to the inside surface of each cylindrical member 172. A pair of front and rear bushes 240, 242 are coupled to the inside surface of the bushing 236 in sliding contact with the outside surface of the sliding shaft 174.

A plurality of shims 244 are attached to the upper end of the sliding shaft 174 in sliding contact with the inside surface of the cylindrical member 172. By increasing or decreasing the number of shims 244, the maximum value of the length 176 of the rear sliding arm 132 can be adjusted. An adjusting nut 246 and a lock nut 250 are threaded on a lower part of the sliding shaft 174. By rotating the nuts 246, 250 the minimum value of the length 176 of the rear sliding arm 132 can be adjusted.

The arm length 176 of the rear sliding arm 132 can change depending on the deflection of the slide rail assembly 100. The rear sliding arm 132 contracts more as the deflection of the rear portion of the slide rail assembly 100 increases. Accordingly, the effective arm length 176 of the rear sliding arm 132 is decreased.

Figure 14A:
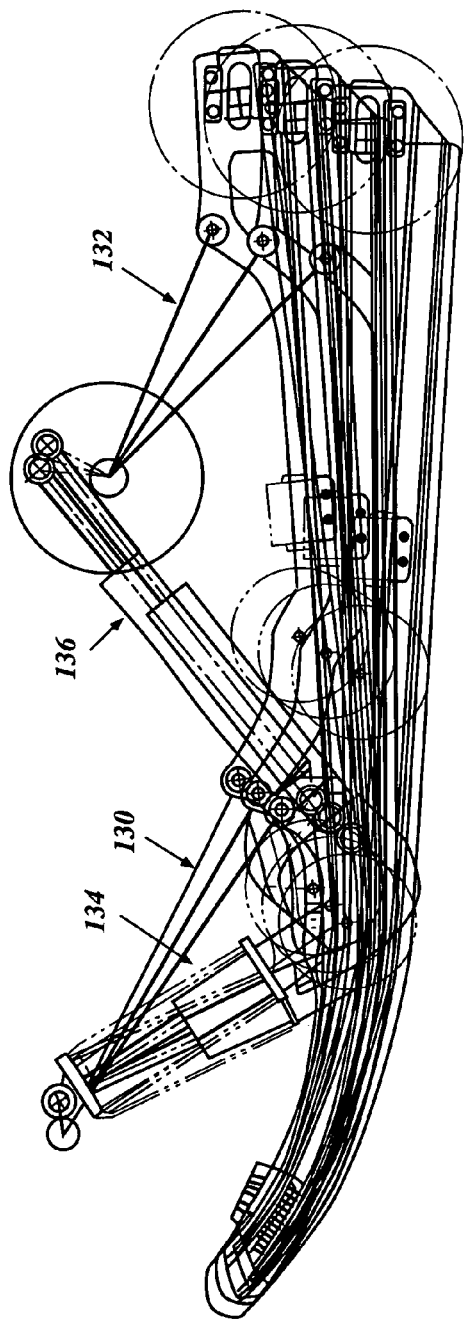
FIGS. 14(a) and 14(b) are schematic views illustrating the operations of the rear sliding arm of the suspension system of FIG. 3.

FIG. 14 schematically illustrates the suspension system 62 as the rear portion of the slide rail assembly 100 is deflected from its initial position and the interaction between the rear sliding arm 132 and the rear shock absorber 136. FIG. 14(a) shows a large deflection of the rear portion of the slide rail assembly 100. The rear sliding arm 132 is shown being compressed from its maximum length to its minimum length. As the deflection of the rear portion of the slide rail assembly 100 increases, the compression stroke of the rear shock absorber 136 also increases. The spring reaction of the rear shock absorber 136 exhibits a generally linear characteristic as the rear sliding arm 132 is compressed from its maximum length to its minimum length.

Figure 14B:
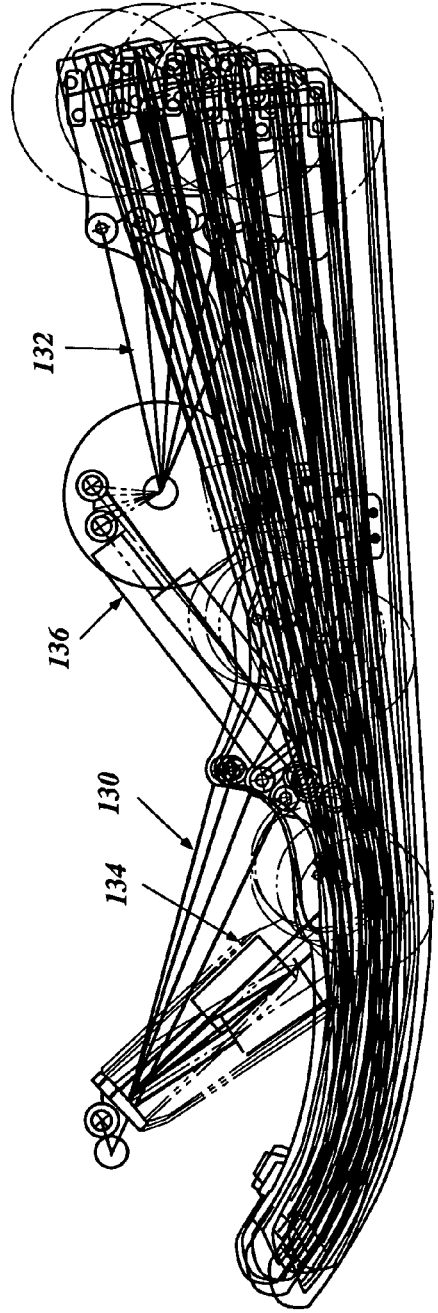

FIG. 14(b) shows a large deflection of the rear portion of the slide rail assembly 100 where the rear sliding arm 132 has already been compressed to its minimum length. As the deflection of the rear portion of the slide rail assembly 100 continues to increase, the compression stroke of the rear shock absorber 136 increases faster than it increased in the configuration illustrated in FIG. 14(a). Accordingly, the spring reaction of the rear shock absorber 136 increases in a generally linear manner as the rear sliding arm 132 is compressed from its maximum length to its minimum length. Further deflection of the slide rail assembly 100, after the rear sliding arm 132 has been compressed to its minimum length causes the spring reaction of the rear shock absorber to increase at a faster rate, and get progressively larger as the deflection of the slide rail assembly 100 increases.

Figure 15:
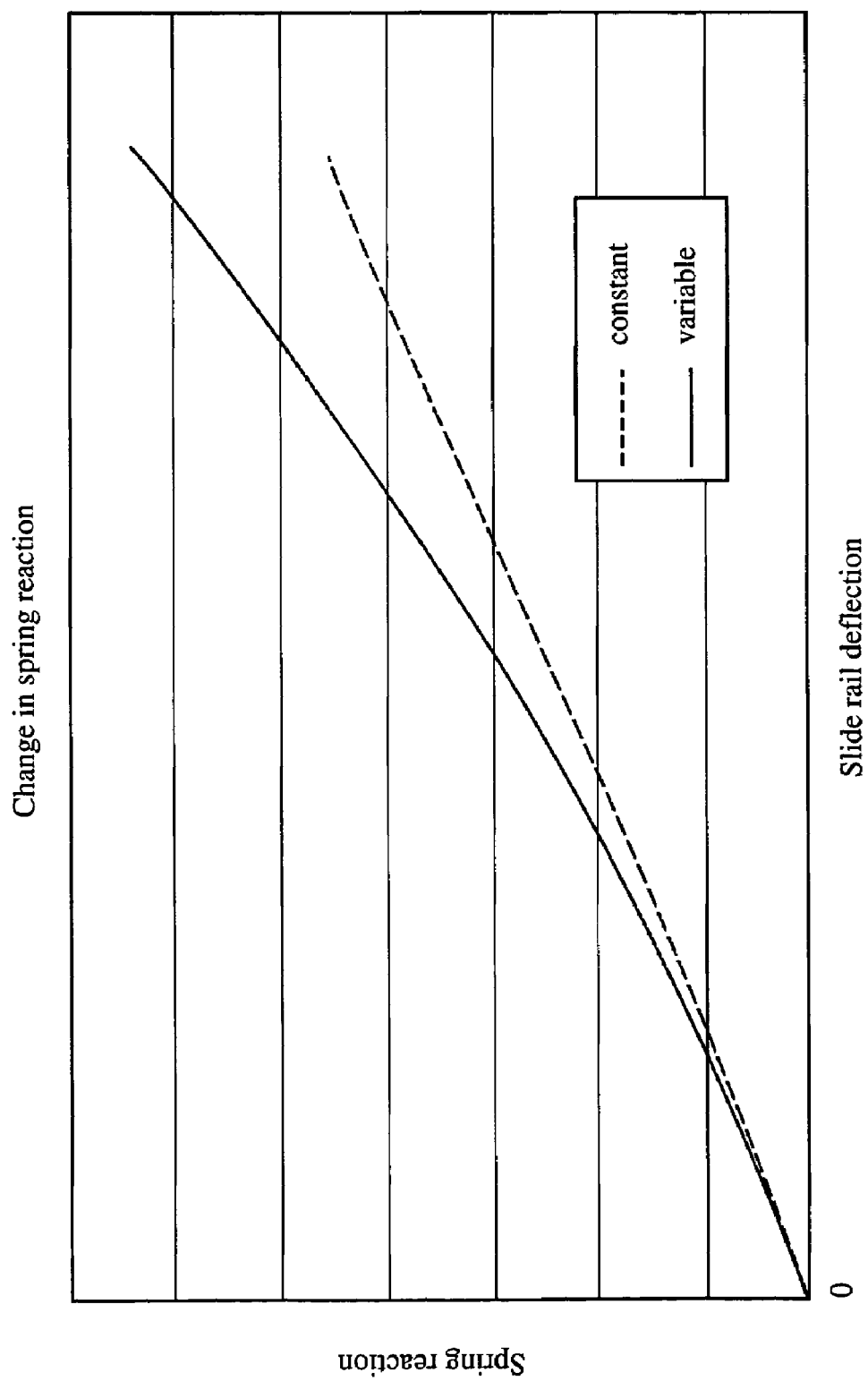
FIG. 15 is a graph of a curve representing the relationship between spring reaction force versus slide rail deflection where the rear sliding arm is provided in the suspension system of FIG. 3.

As shown in FIG. 15, the spring reaction increases in a non-linear manner. The spring reaction associated with the suspension system 62 comprising the rear sliding arm 132 is relatively small during an initial range of deflection of the slide rail assembly 100. During the initial range of deflection of the slide rail assembly 100, the spring reaction increases at a relatively constant rate relative the deflection of the slide rail assembly 100. However, as the deflection of the slide rail assembly 100 increases, the spring reaction begins to increase at a faster rate.

A relatively small spring reaction during an initial range of deflection results in a suspension system 62 that is relatively flexible. A more flexible suspension system 62 can compensate for smaller deflections and provide a comfortable ride. A relatively larger spring reaction during a latter range of deflection results in a suspension system 62 that is relatively stiff. A stiffer suspension system 62 can compensate for larger deflections and inhibit bottoming-out. Bottoming-out, for example, includes reaching the end of the range of travel of the suspension system. Accordingly, the rear sliding arm 132 is configured such that the spring reaction of the suspension system increases at a faster rate as the amount of deflection of the slide rail assembly 100 increases.

A suspension system 62 therefore can have a rear sliding arm 132 configured so that the suspension system 62 exhibits progressively increasing stiffness corresponding to increased deflection of the slide rail assembly 100 to provide a comfortable ride and inhibit bottoming-out. In some cases, the suspension system 62 can exhibit exponentially increasing stiffness. The effective length 176 of the rear sliding arm 132 is decreased as the slide rail assembly 100 is deflected. Accordingly, the shock ratio, which is the shock absorber stroke per unit deflection of the slide rail, is increased and the spring reaction is also increased. As a result, the stiffness of the suspension system 62 increases progressively faster as the deflection of the slide rail assembly 100 increases. Thus, riding comfort is improved and bottoming-out can be inhibited. Additionally, no stopper mechanism is needed. Accordingly, an increase in the number of parts, weight and cost of the vehicle can be avoided. Additionally, the torsional rigidity of the rear arm members about their axes is improved because the rear arm members 160, 162 and the rear shock absorber 136 are coupled with the bracket 164.

Operation of the Linkage Mechanism

As discussed above with reference to FIGS. 6 and 7, the linkage mechanism 140 comprises a first linkage member 194, a second linkage member 196, and a third linkage member 200. In the illustrated embodiment, the first linkage member 194 comprises a pair of right and left plates having an arcuate shape as viewed from a side. A first portion 252 of the first linkage member 194 is pivotally coupled to the lower end of the front shock absorber 134 at a first linkage coupling point 254. The first portion 252 of the first linkage member 194 preferably is a lower end of the first linkage member 194. The lower end of the front shock absorber 134 preferably comprises the cylinder 182 of the front shock absorber 134. A second portion 256 of the first linkage member 194 is pivotally coupled to the slide rail assembly 100 at a second linkage coupling point 260. The first linkage member 194 preferably is pivotally coupled to the slide rail assembly 100 via the intermediate cross shaft 116 extending from the right side rail 110 to the left side rail 112. A third portion 262 of the first linkage member 194 is pivotally coupled to a first portion 264 of the third linkage member 200 at a third linkage coupling point 266.

The second linkage member 196 comprises a pair of right and left plates. The first portion 270 of the second linkage member 196 preferably is fixed to the lower arm shaft 152 of the front suspension arm 130 so as to be pivotally coupled to the slide rail assembly 100 at the front rail coupling location 154. A second portion 272 of the second linkage member 196 is pivotally coupled to a second portion 274 of the third linkage member 200 at a fourth linkage coupling point 276.

The third linkage member 200 comprises a pair of right and left plates having a generally triangular shape as viewed from a side. As stated previously, the third linkage member 200 has a first portion 264 pivotally coupled with the third portion 262 of the first linkage member 194. The second portion 274 of the third linkage member 200 is generally located toward the top of the triangular shape. As mentioned above, the second portion 274 of the third linkage member 200 is pivotally coupled with the second portion 272 of the second linkage member 196. A third portion 280 of the third linkage member 200 is pivotally coupled to the lower end of the rear shock absorber 136 at a fifth linkage coupling point 282. The third portion 280 of the third linkage member 200 preferably is pivotally coupled to the cylinder 190 of the rear shock absorber 136.

The front rail coupling location 154, the second linkage coupling point 260, and the fourth linkage coupling point 276 are arranged such that the distance between the second linkage coupling point 260 and the fourth linkage coupling point 276 changes in a predetermined manner relative to a deflection of the slide rail assembly 100. The front rail coupling location 154, the second linkage coupling point 260, and the fourth linkage coupling point 276 are arranged such that a first arc 284 is defined by a constant radius 286 extending from the front rail coupling location 154 to the second linkage coupling point 260. A second arc 290 is defined by a variable radius 292 extending from the fourth linkage coupling point 276 to the second linkage coupling point 260. The radius 292 of the second arc 290 varies according to the amount of deflection of the slide rail assembly 100. In a plan view the first and second arcs 284, 290 appear in the same plane, and the first arc 284 and second arc 290 overlap due to the deflection of the slide rail assembly 100.

The positional relationship between the front rail coupling location 154, the second linkage coupling point 260, and the fourth linkage coupling point 276 determines the amount that the distance 292 between the second linkage coupling point 260 and the fourth linkage coupling point 276 will change based on an upward deflection of the slide rail assembly 100. The length of the distance 292 between the second linkage coupling point 260 and the fourth linkage coupling point 276 decreases during an initial portion of the deflection range of the slide rail assembly 100 and increases during a latter portion of the deflection range of the slide rail assembly 100. The distance 292 between the second linkage coupling point 260 and the fourth linkage coupling point 276 begins to increase when the deflection of the slide rail assembly 100 has caused the second linkage coupling point 260 to reach a changing point 294.

During the initial portion of the deflection range of the slide rail assembly 100, where the length 292 between the second linkage coupling point 260 and the fourth linkage coupling point 276 is decreased, the operation rates of the front and rear shock absorbers 134, 136 are relatively small compared to the amount of deflection of the slide rail assembly 100. For example, the amount of compression of the shock absorbers 134, 136 is relatively small compared with the amount of deflection of the slide rail assembly 100 during the initial deflection range. Accordingly, the spring reaction of the shock absorbers 134, 136 is relatively small. A relatively small spring reaction during an initial range of deflection results in a suspension system 62 that is relatively flexible. A more flexible suspension system 62 can compensate for smaller deflections and provide a comfortable ride.

In the latter part of the deflection range, where the length 292 between the second linkage coupling point 260 and the fourth linkage coupling point 276 is increased, the operation rates of the front and rear shock absorbers 134, 136 are relatively large compared to the amount of deflection of the slide rail assembly 100. For example, the amount of compression of the shock absorbers 134, 136 is relatively large compared with the amount of deflection of the slide rail in the latter deflection range. Accordingly, the spring reaction of the shock absorbers 134, 136 is relatively large. A relatively larger spring reaction during a latter range of deflection results in a suspension system 62 that is relatively stiff. A stiffer suspension system 62 can compensate for larger deflections and inhibit bottoming-out. Accordingly, the front rail coupling location 154, the second linkage coupling point 260, and the fourth linkage coupling point 276 are configured and arranged such that as the deflection of the slide rail assembly 100 increases, the spring reaction forces of the shock absorbers 134, 136 increase at a faster rate.

The second linkage coupling point 260, the third linkage coupling point 266, and the fourth linkage coupling point 276 are arranged to form a triangle with vertex angles and side lengths such that each stroke of the front and rear shock absorbers 134, 136, and the direction of each stroke, changes in a predetermined manner. In the embodiment shown in FIG. 7, for example, the second linkage coupling point 260, the third linkage coupling point 266, and the fourth linkage coupling point 276 are arranged so that the vertex angles at the second linkage coupling point 260 and the fourth linkage coupling point 276 are always acute. Based on the configuration of the second linkage coupling point 260, the third linkage coupling point 266, and the fourth linkage coupling point 276, the operation rates of the front and rear shock absorbers 134, 136 both decrease when the length 292 between the second linkage coupling point 260 and the fourth linkage coupling point 276 becomes shorter. The operation rates of the front and rear shock absorbers 134, 136 both and increase when the length 292 between the second linkage coupling point 260 and the fourth linkage coupling point 276 becomes longer. The second linkage coupling point 260, the third linkage coupling point 266, and the fourth linkage coupling point 276 are arranged such that the vertex angles of the triangle at the second linkage coupling point 260 and at the fourth linkage coupling point 276 are always acute. Accordingly, the second linkage coupling point 260, the third linkage coupling point 266, and the fourth linkage coupling point 276 are configured and arranged such that as the deflection of the slide rail assembly 100 increases, the spring reaction forces of the shock absorbers 134, 136 increase at a faster rate.

Additionally, by properly determining (1) a ratio of the (a) distance 296 between the second linkage coupling point 260 and the third linkage coupling point 266 to (b) the distance 300 between the first linkage coupling point 254 and the second linkage coupling point 260, and (2) a ratio of (a) the distance 302 between the third linkage coupling point 266 and the fourth linkage coupling point 276 to (b) the distance 304 between the fourth linkage coupling point 276 and the fifth linkage coupling point 282, the displacement of the front and rear shock absorbers 134 and 136 can be tailored as desired.

The linkage mechanism 140 preferably can be adjusted so that the shock ratio or lever ratio, which is a ratio of the shock absorber stroke to the deflection of the slide rail, can be adjusted according to the deflection range of the slide rail assembly 100. FIGS. 16-21 relate to front deflection, even deflection, and rear deflection of the slide rail assembly 100. FIGS. 16-21 include charts illustrating shock ratio values of front and rear shock absorbers 134, 136 relative to the slide rail assembly 100 deflections. Each chart includes shock ratio values according to one embodiment of the invention and shock ratio values according to a known vehicle. These values and results are merely exemplary of those obtainable with the illustrated suspension system.

Figure 16:
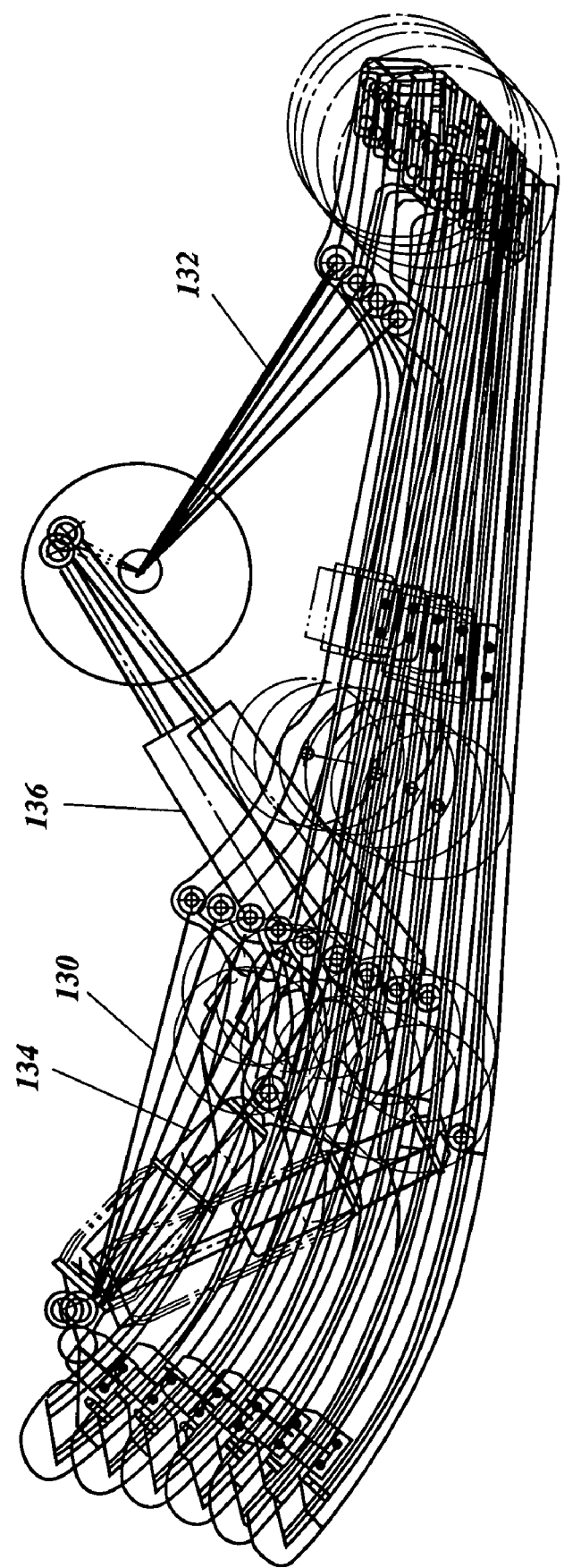
FIG. 16 is a schematic view illustrating the operations of the linkage mechanism of the suspension system of FIG. 3.
Figure 17:
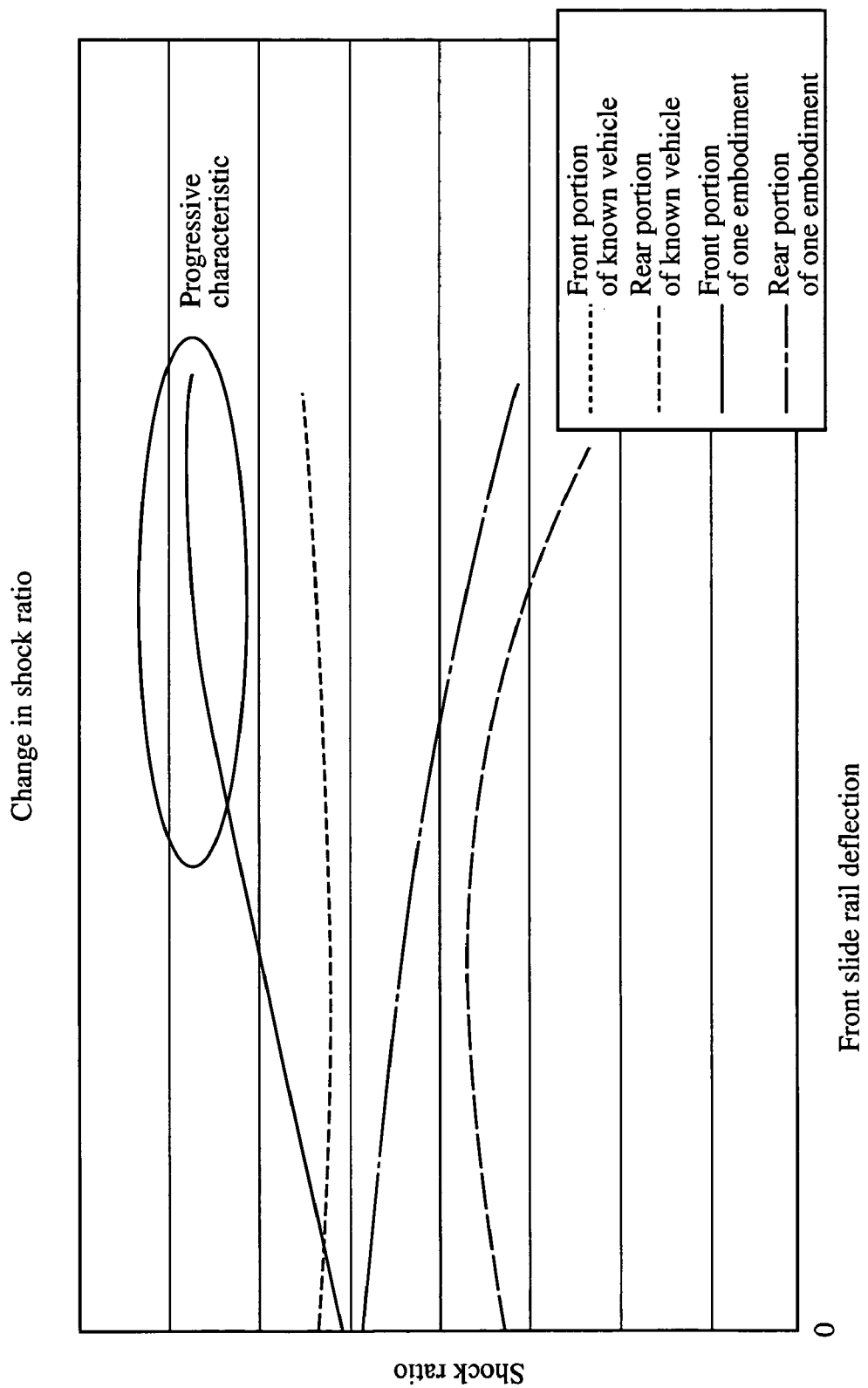
FIG. 17 is a graph of a curve showing the relationship between shock ratio versus slide rail deflection of the suspension system of FIG. 3.

With reference to FIGS. 16 and 17, a force is applied to a front portion of the slide rail assembly 100 causing a large deflection of the front portion of the slide rail assembly 100. The shock ratio of the front shock absorber (i.e., the stroke of the front shock absorber 134 per unit deflection of the front portion of the slide rail assembly 100), according to the embodiment, increases as the deflection of the front portion of the slide rail assembly 100 increases. The shock ratio of a front shock absorber of the known vehicle remains relatively constant as the deflection of the slide rail increases. Additionally, the shock ratio of the rear shock absorber 136 according to the embodiment is relatively higher than the shock ratio of a rear shock absorber of the known vehicle.

The amount of compression of the front shock absorber 134 of the embodiment is relatively large compared with the amount of deflection of the slide rail assembly 100 in the latter deflection range. Accordingly, the spring reaction of the front shock absorber 134 is relatively large. A relatively larger spring reaction during a latter range of deflection and a relatively smaller spring reaction during an initial range of deflection results in a suspension system 62 that gets progressively stiffer with the increased deflection of the slide rail assembly 100. In some cases, the suspension system gets exponentially stiffer with the increased deflection of the slide rail. This provides both a comfortable ride and protection against bottoming-out. In contrast, as seen in FIG. 17, the shock ratio for the front shock absorber of the known vehicle remains relatively constant and does not provide the same level of protection against bottoming-out.

Figure 18:
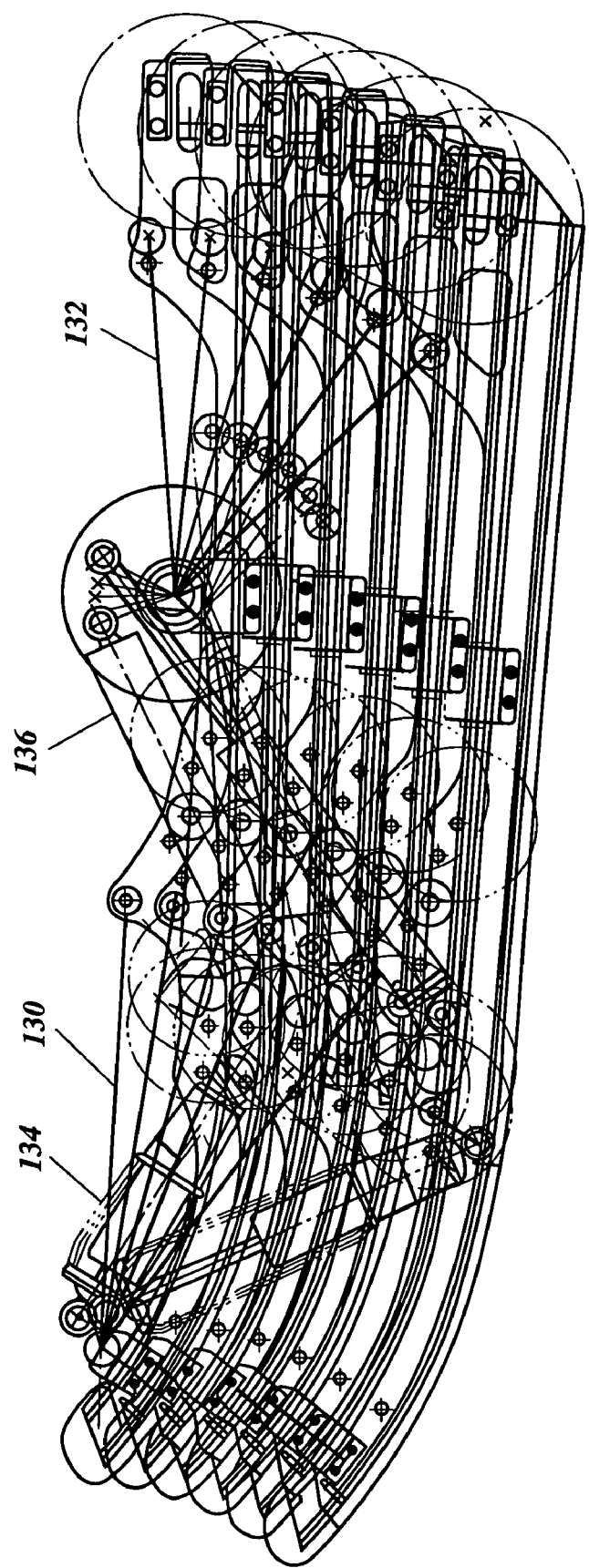
FIG. 18 is a schematic view illustrating the operations of the linkage mechanism of the suspension system of FIG. 3.
Figure 19:
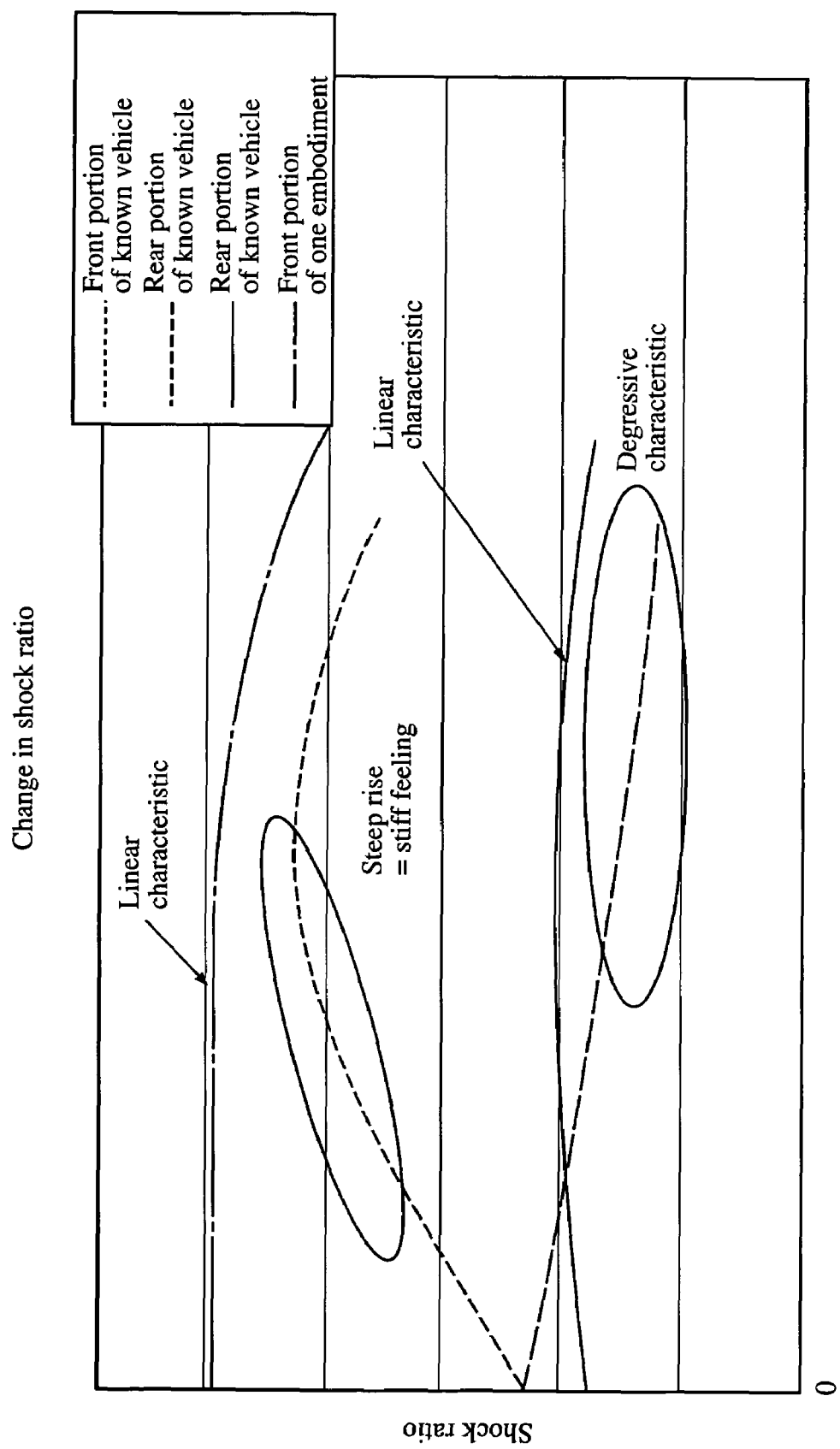
FIG. 19 is a view of a graph showing the relationship between shock ratio versus slide rail deflection of the suspension system of FIG. 3.

FIG. 18 shows a slide rail assembly 100 at different stages of deflection caused by an evenly applied deflection force. FIG. 19 is a graph illustrating the change in shock ratios of the shock absorbers caused by the deflection. With reference to FIG. 18, a force is applied evenly to the entire slide rail assembly 100 and the entire slide rail assembly 100 is deflected. With reference to FIG. 19, the shock ratios of both the front and rear shock absorbers 134, 136 of the embodiment maintain a linear characteristic and remain relatively constant as the amount of deflection of the entire slide rail assembly 100 increases. This response produces a comfortable ride. The shock ratio of the front shock absorber of the known vehicle increases significantly during the initial deflection period of the slide rail assembly 100. This causes the suspension to be relatively stiff, even when the amount of deflection of the slide rail is relatively small, producing an uncomfortable ride. The shock ratio of the rear shock absorber of the known vehicle decreases as the deflection of the slide rail increases.

Figure 20:
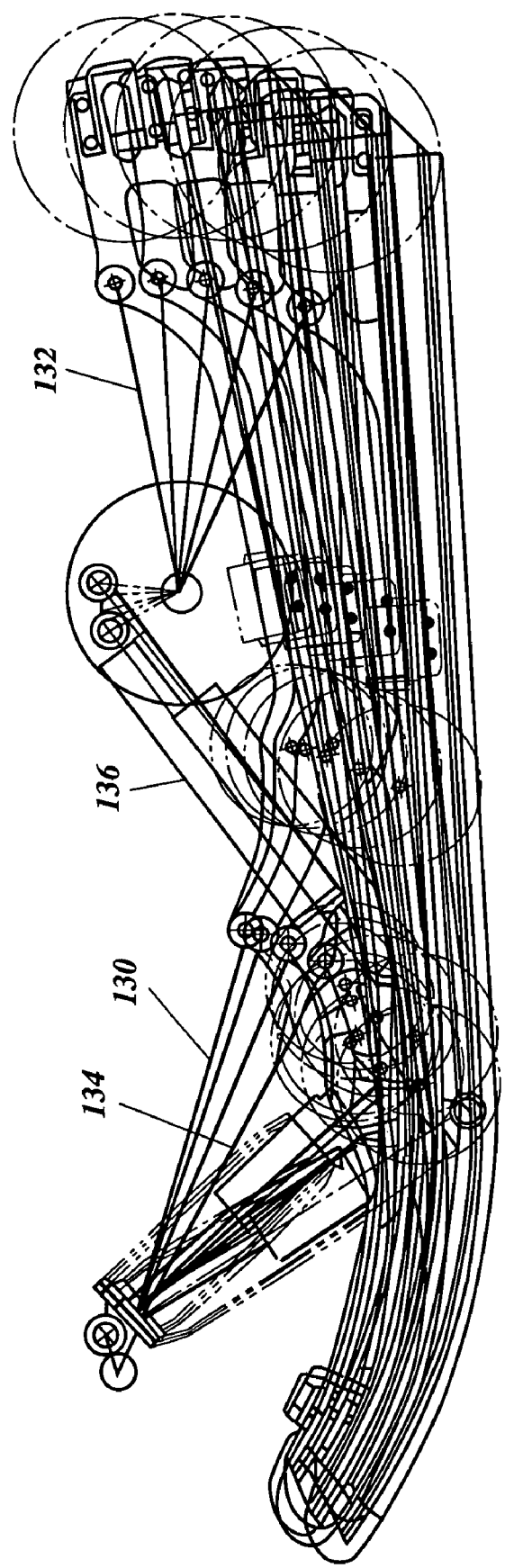
FIG. 20 is a schematic view illustrating the operations of the linkage mechanism of the suspension system of FIG. 3.
Figure 21:
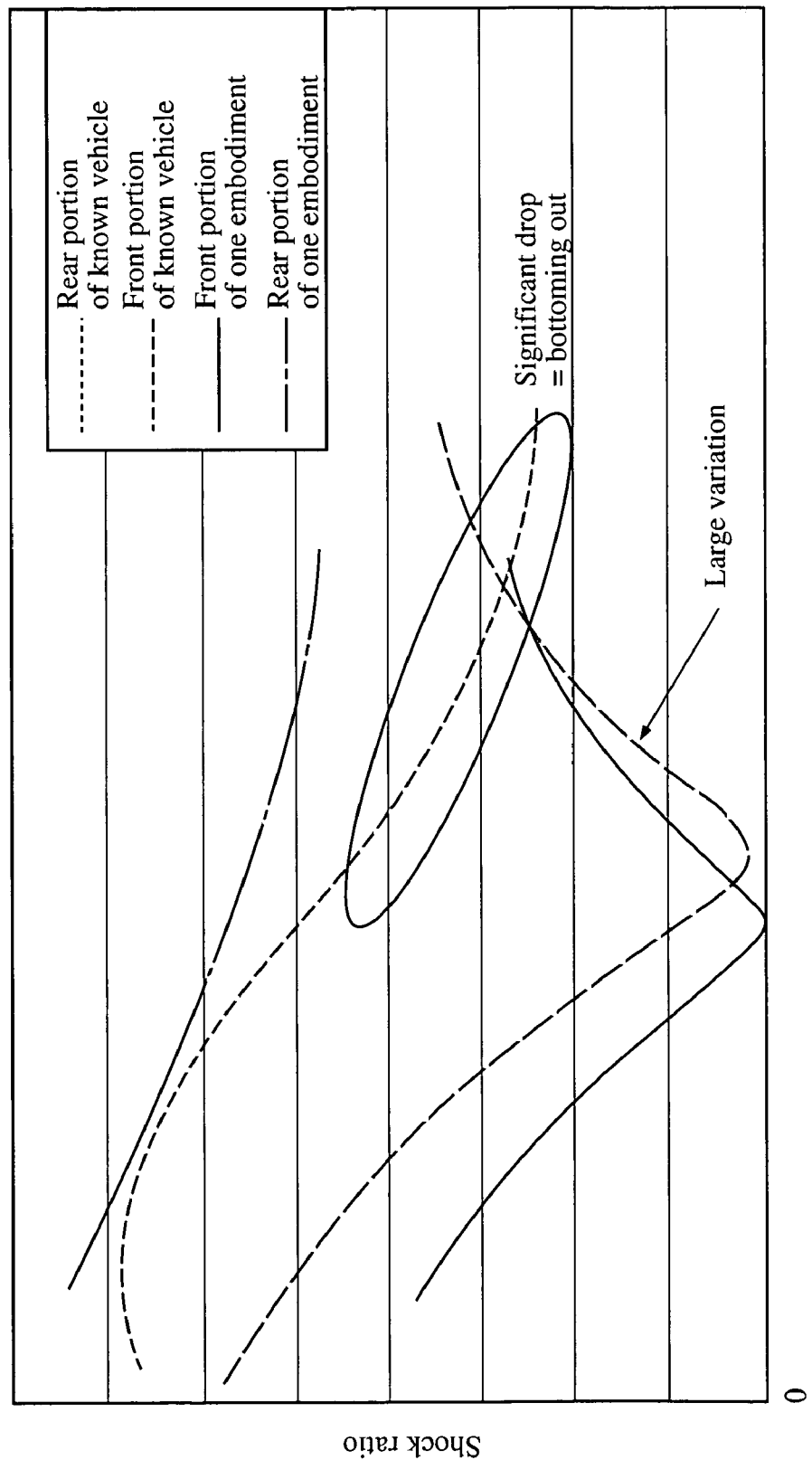
FIG. 21 is a graph of a curve showing the relationship between shock ratio versus slide rail deflection of the suspension system of FIG. 3.

FIG. 20 shows a slide rail assembly 100 at different stages of deflection caused by an evenly applied deflection force. FIG. 21 is a graph illustrating the change in shock ratios of the shock absorbers caused by the deflection. With reference to FIG. 20, a force is applied to a rear portion of the slide rail assembly 100 causing a large deflection of the rear portion of the slide rail assembly 100. With reference to FIG. 21, the shock ratio of the rear shock absorber 136 of the embodiment decreases only moderately as the deflection of the rear portion of the slide rail assembly 100 increases. The shock ratio of the rear shock absorber of the known vehicle decreases significantly as the deflection of the rear portion of the slide rail increases. The significant decrease in the shock ratio of the rear shock absorber of the known vehicle increases the likelihood that the vehicle will bottom-out. The moderate decrease of the shock ratio of the rear shock absorber 136 of the embodiment is less likely to bottom-out. Additionally, the range of variation in the shock ratio of the front shock absorber 134 of the embodiment is decreased compared with the shock ratio of the front shock absorber of the known vehicle, providing a more comfortable ride.

Accordingly, a suspension system 62 can have a linkage mechanism 140 coupling a shock absorber 134, 136 to the slide rail assembly 100 so that the shock ratio is suitable for the deflection range of the slide rail assembly 100, and so that the suspension system 62 exhibits stiffness that increases in a non-linear manner corresponding to increased deflection of the slide rail assembly 100 to provide a comfortable ride and inhibit bottoming-out. When the slide rail assembly 100 is deflected, in the initial part of the deflection range, the compression rates of the front and rear shock absorbers 134, 136 (the compression of the shock absorbers 134, 136 per unit deflection of the slide rail assembly 100) is small. Thus, the spring reaction is small enough to provide a comfortable ride. In the latter part of the deflection range, the compression rates of the front and rear shock absorbers 134, 136 are large and the spring reaction is large. Accordingly as the deflection of the slide rail assembly 100 increases, the stiffness of the suspension system 62 increases progressively faster. Additionally, the compression rates of the front and rear shock absorbers 134, 136 exhibit similar tendencies relative to the change in the length 292 between the second linkage coupling point 260 and the fourth linkage coupling point 276. For example, the operation rates of the front and rear shock absorbers 134, 136 both become smaller when the length 292 becomes shorter, and become larger when the length 292 becomes longer. Thus, the front and rear spring reaction characteristics exhibit similar tendencies.

Operation of the Spring Members and Spring Supports

As described above, torsion springs 142 are located between the body frame 54 and the slide rail assembly 100 to urge the slide rail assembly 100 away from the body frame 54. As the vehicle 50 travels and the slide rail assembly 100 is deflected upward, the torsion springs 142 are elastically deformed to absorb the shock. As shown in FIGS. 9(*a*), 9(*b*), 9(*c*) and 10, when the deflection of the slide rail assembly 100 is within an initial range, which is not greater than a predetermined amount, the torsion springs 142 are elastically deformed with the ends 212 of the long end portions 204 being supported on the spring support brackets 214. Thus, the spring reaction of the torsion spring 142 corresponds to curve A shown in FIG. 10, where the spring reaction is related to the length 306 of the long end portion 204 of the torsion spring 142. The spring reaction is relatively small during an initial range of deflection. This results in a suspension system 62 that is relatively flexible. A more flexible suspension system 62 can compensate for smaller deflections and provide a comfortable ride.

Figure 10:
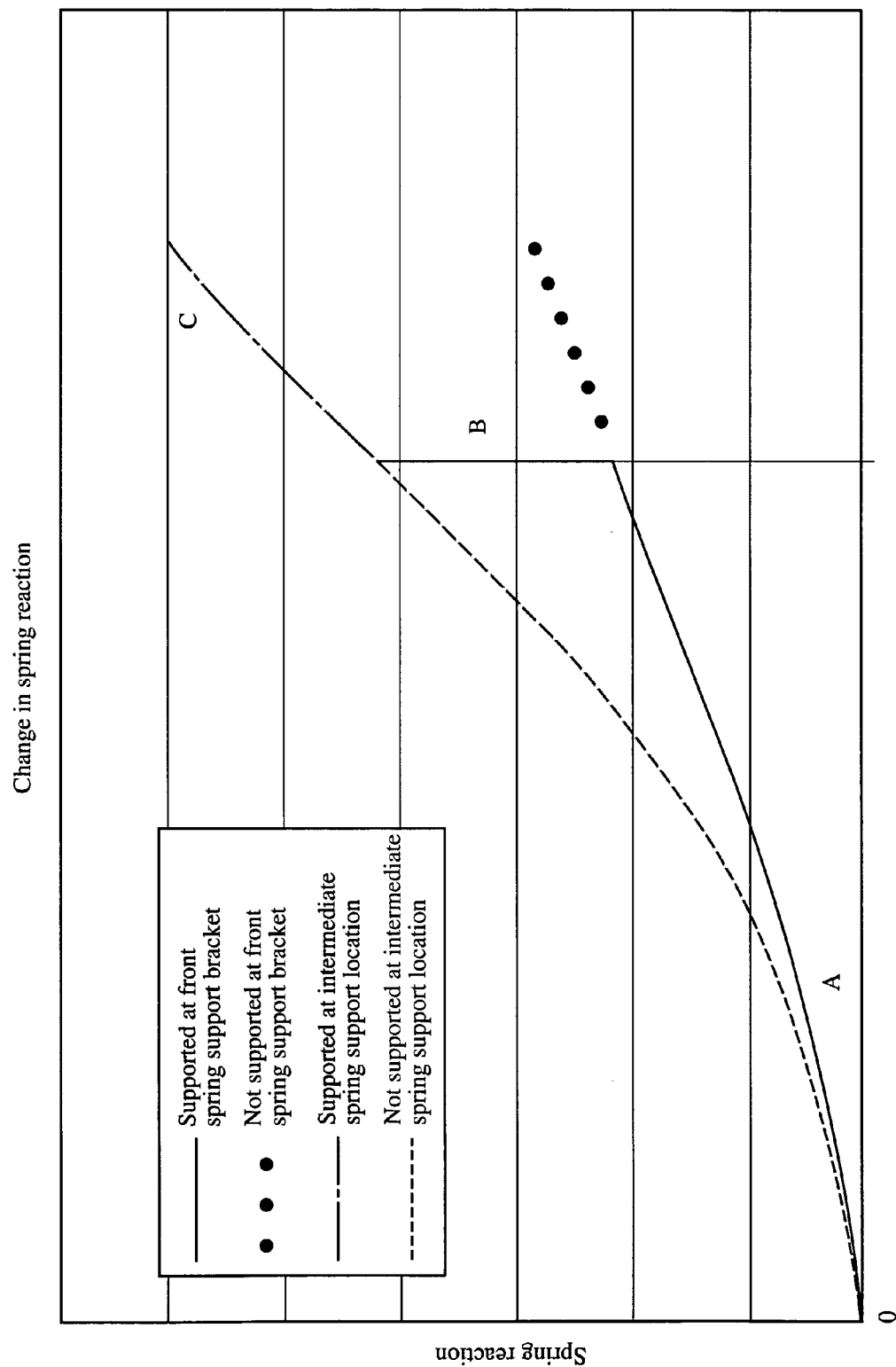
FIG. 10 is a graph of a curve representing the relationship between a spring reaction force versus an amount of slide rail deflection of the suspension system of FIG. 3.

When the upward deflection of the slide rail assembly 100 reaches the prescribed amount, the spring support members 232 contact the long end portions 204 of the torsion springs 142 at the intermediate spring support locations 234. As the torsion springs 142 contact the spring support members 232, the spring reactions sharply increase in a step-like fashion, as shown in FIG. 10 by curve B.

When the upward deflection of the slide rail assembly 100 increases beyond the prescribed amount, the long end portions 204 of the torsion springs 142 are elastically deformed by the spring support members 232. Thus, the spring reaction of the torsion spring 142 corresponds to curve C shown in FIG. 10, where the spring reaction is related to the length 310 of the short spring section between the rear frame coupling location 156 and the intermediate spring support location 234. The spring reaction increases significantly as the deflection of the slide rail assembly 100 increases. A relatively larger spring reaction during a latter range of deflection results in a suspension system that is relatively stiff. A stiffer suspension system can compensate for larger deflections and inhibit bottoming-out. Accordingly, the torsion spring 142 and the intermediate spring support locations 234 are configured to have a spring reaction that increases significantly as the amount of deflection of the slide rail assembly 100 increases.

Figure 11:
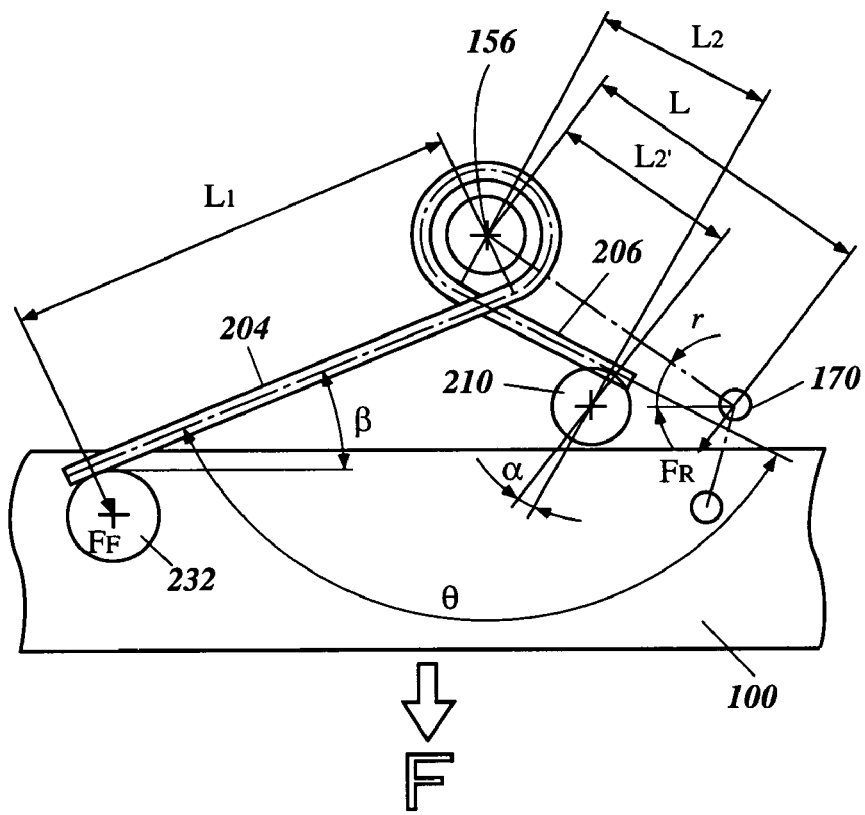
FIG. 11 is a schematic view showing the reaction forces associated with the torsion spring of the suspension system of FIG. 3.

With reference to FIG. 11, L1 is the arm length of the long end portion 204 of the torsion spring 142, L2 is the arm length of the short end portion 206 of the torsion spring 142, and L3 is the length of the rear sliding arm 132. The reaction force F is obtained from the following equation:

$$F = F_F \cos \beta + F_R \cos \gamma = k(\theta - \theta_0)[(\cos \beta / L1) + (L2'/L3L2)(\cos \alpha \cdot \cos \gamma)]$$

With continued reference to FIG. 11, $F_F$ is the force that the long end portion 204 exerts on the spring support member 232 at the intermediate spring support location 234. $\beta$ is the angle formed by the long end portion 204 and a horizontal line. $F_R$ is the force that the short end portion 206 exerts on the bracket 210 of the rear sliding arm 132. $\gamma$ is the angle formed by the short end portion 206 and a horizontal line. k is a constant. $\theta$ is the angle formed by the long end portion 204 and the short end portion 206. It is apparent from the equation that when the arm length L1 of the long end portion 204 is shorter, the spring reaction F is greater.

The openings 230 formed in the slide rail assembly 100 are at longitudinally spaced points so that each of the spring support members 232 can be removably attached in one of the openings 230. Changing the positions of the spring support members 232 on the slide rail assembly 100 will change the spring reaction characteristic. Thus, the user can alter the spring reaction characteristic as desired by adjusting the location where the spring support members 232 are coupled to the slide rail assembly 100. Changing the positions of a pair of spring support members 232 can change the spring reaction characteristic. Additionally, more than one pair of spring support members 232 can be provided. The spring reaction can be adjusted to any one of many levels within a broad range.

Figure 12:
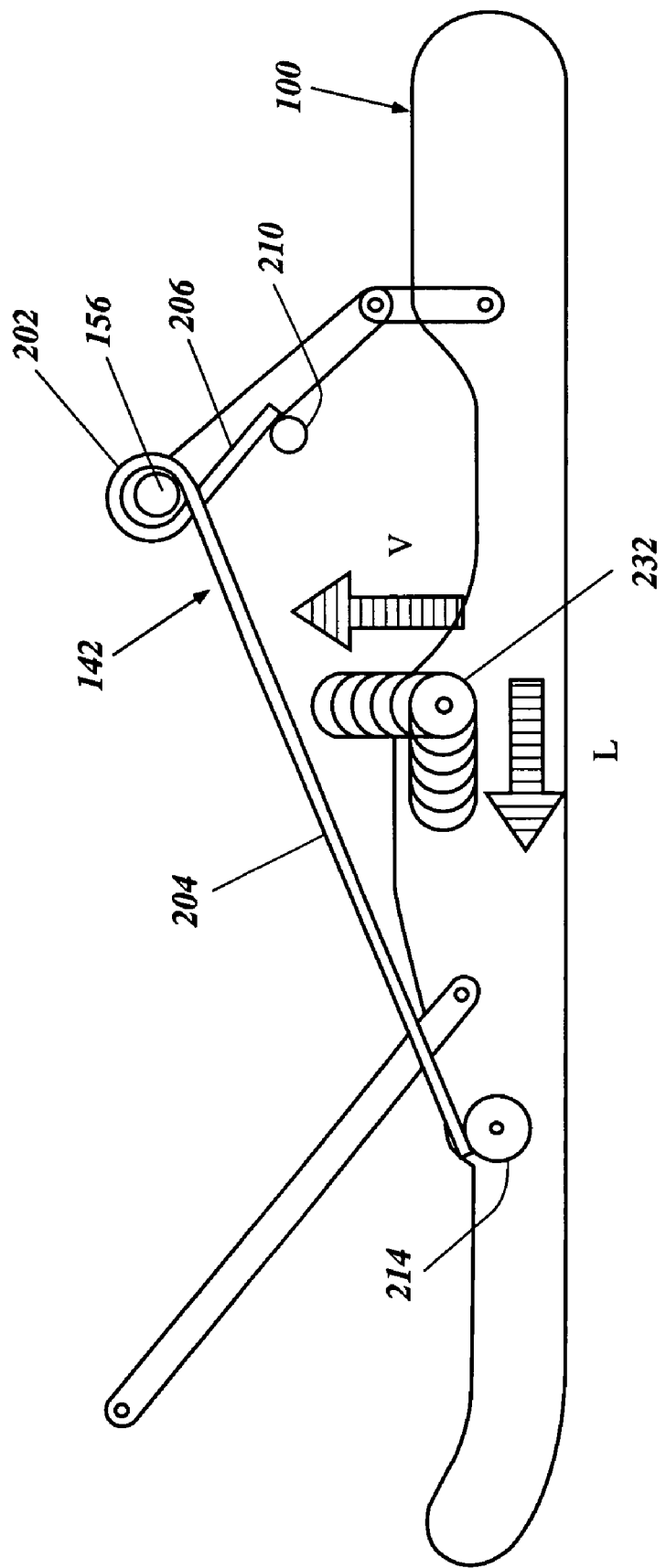
FIG. 12 is a schematic view illustrating a change in position of a spring support member of the suspension system of FIG. 3.
Figure 13:
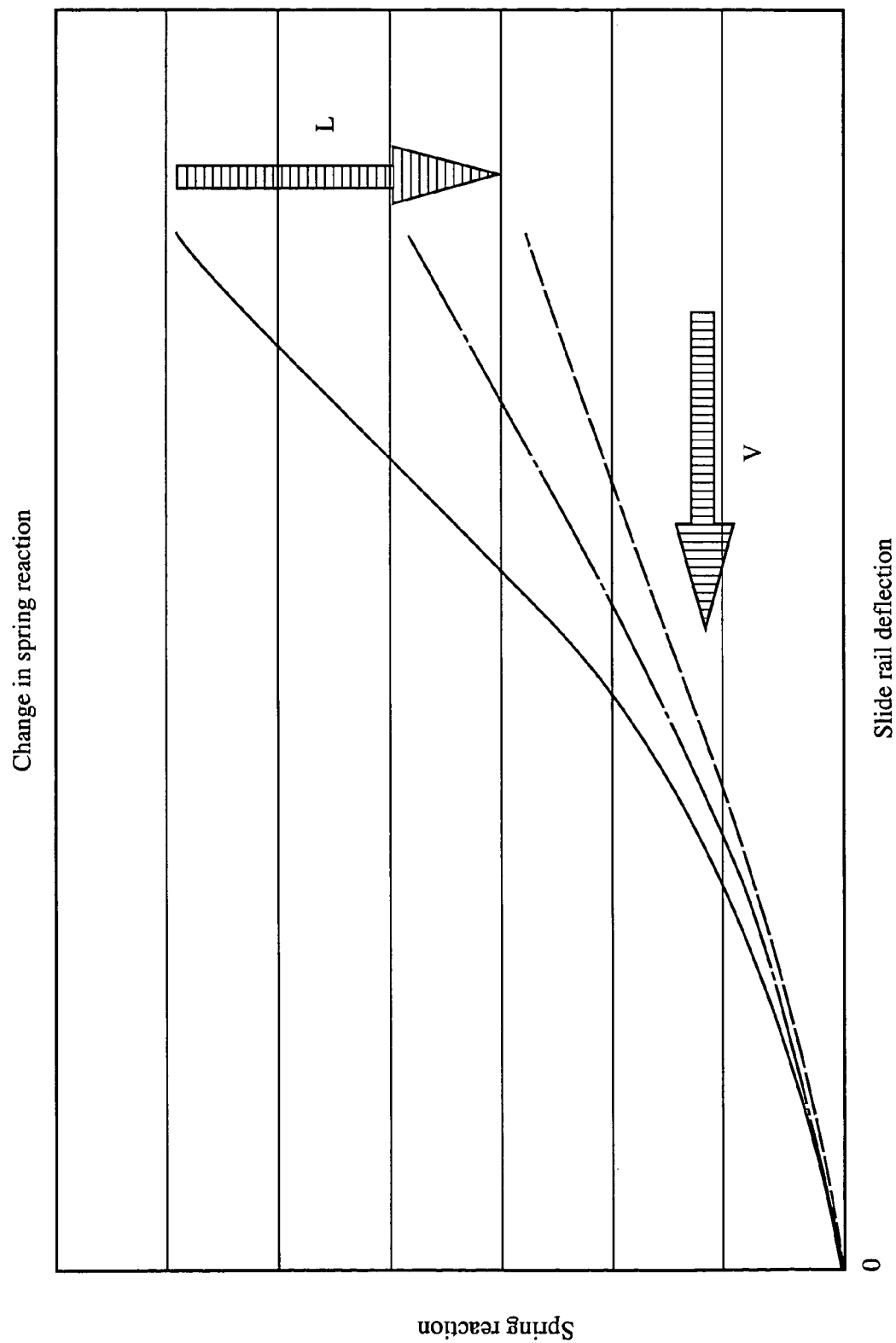
FIG. 13 is a graph of a curve representing the relationship between spring reaction force versus slide rail deflection where the position of the spring support member of FIG. 12 is changed.

The positions of the spring support members 232 are not limited to those described in connection with the illustrated embodiment. The positions of the spring support members 232 in other embodiments can be changed according to the user's preference. As shown in FIGS. 12 and 13, the positions of the spring support members may be adjusted in a vertical direction V, in a longitudinal direction L, or in both the vertical and longitudinal directions V, L. The positions of the spring support members 232 may be adjusted in a continuous manner or in stages.

By adjusting the positions of the spring support members 232 in the vertical direction V, the amount of deflection, which occurs before the spring reaction is changed, can be adjusted. Additionally, adjusting the positions of the spring support members in the longitudinal direction L alters how drastically the spring reaction changes. With reference to FIG. 13, the increase in the spring reaction is more moderate when the spring support members 232 are located higher or closer to the front. The increase in the spring reaction is more abrupt as the spring support members 232 are located lower or closer to the rear.

Therefore, a suspension system can have one or more torsion spring and one or more spring supports configured such that the suspension system has a shock ratio suitable for the deflection range of the slide rail. Consequently, the suspension system can exhibit stiffness that increases in a non-linear manner corresponding to increased deflection of the slide rail to provide a comfortable ride and inhibit bottoming-out. Where the deflection of the slide rail is not greater than a prescribed amount, the suspension system is relatively flexible because the spring reaction increases moderately during the initial deflection range of the slide rail, thus providing a comfortable ride. When the deflection of the slide rail reaches or exceeds the prescribed amount, the suspension system is relatively stiffer because the spring reaction sharply increases when the spring support member contacts the torsion spring. As a result, bottoming-out can be inhibited. In some embodiments, since the position of the spring support member is adjustable relative to the torsion spring, the spring reaction characteristic can be varied depending upon the user's preference within a relatively wide range. Also, in some embodiments, since the operation angle of the spring member is small, the spring stress generated in the spring member is small.

FIGS. 22-25 illustrate another embodiment. The spring reaction characteristic of a torsion spring 142a can be adjusted manually by a user. The spring reaction characteristic can be adjusted to a first level to accommodate a single rider. The spring reaction characteristic can also be adjusted to a second level to accommodate a plurality of riders. Adjustments preferably can be made without a tool. The same reference numerals used in connection with FIGS. 1-21 will be used to designate the same or corresponding parts in FIGS. 22-25, except that the suffix letter "a" is added.

Figure 22:
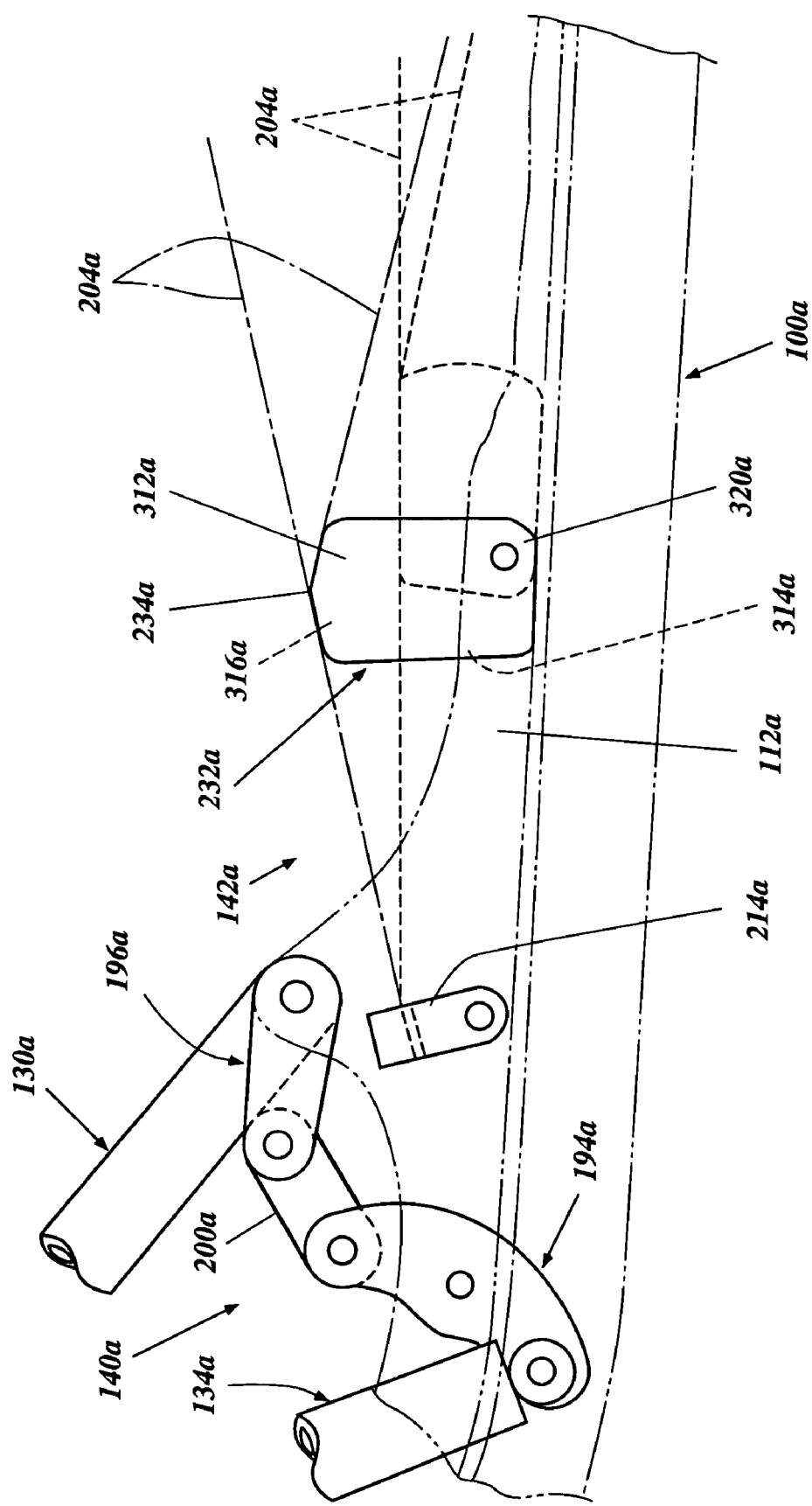
FIG. 22 is a schematic view of a portion of a suspension system according to another embodiment of the present invention.
Figure 23:
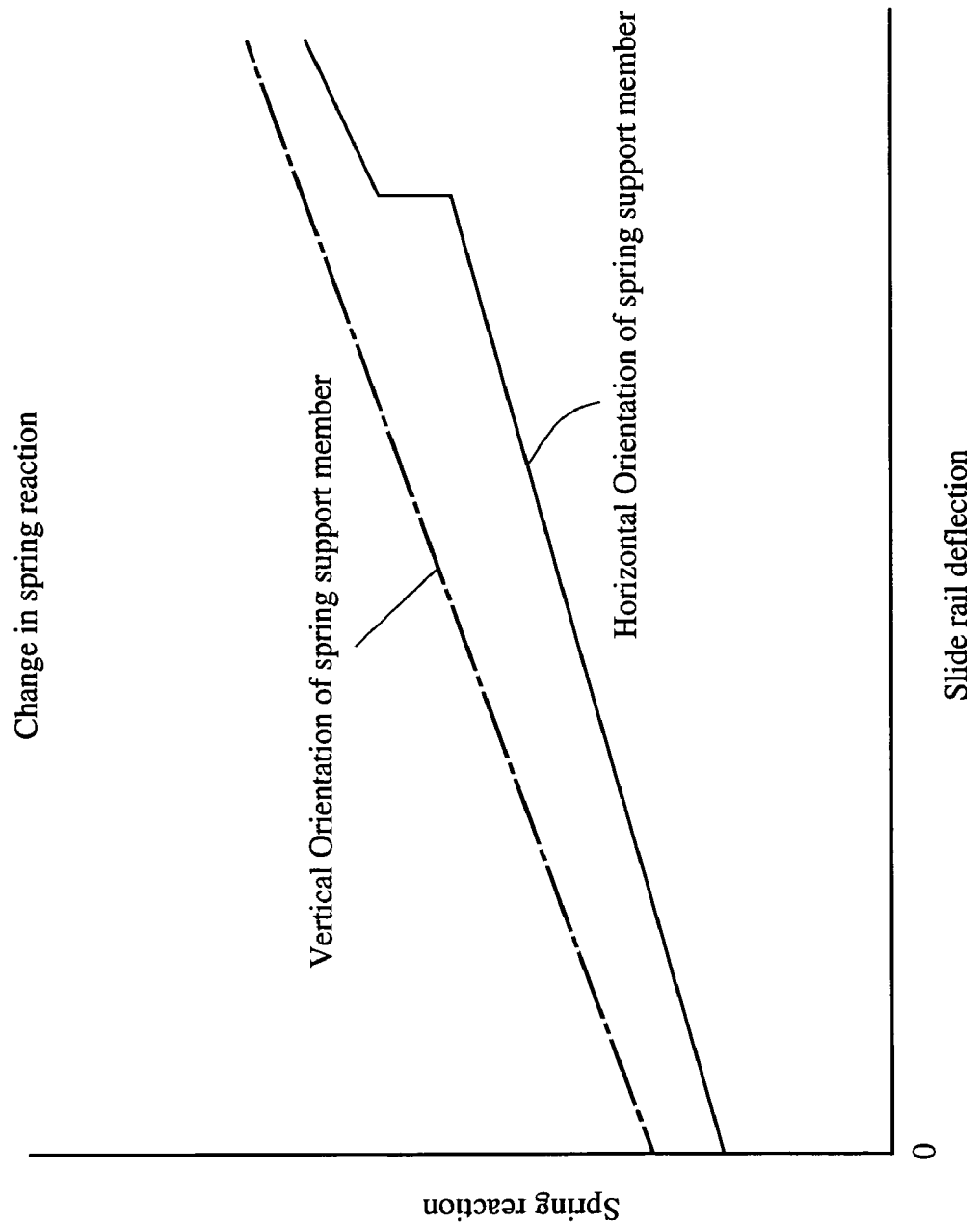
FIG. 23 is a graph of a curve showing the relationship between spring reaction force versus slide rail deflection for the suspension system of FIG. 22.

FIG. 22 shows a spring support member 232a for supporting a long end portion 204a of a torsion spring 142a at intermediate spring support locations 234a. The spring support member 232a is movable between a vertical orientation and a horizontal orientation relative to the slide rail assembly 100a. The spring support member 232a has a spring support block 312a. The spring support block 312a preferably is made of aluminum alloy or other suitable material. The spring support block 312a can have a generally rectangular shape as viewed from a side. The spring support block 312a has a long spring support groove 314a along one long side of the rectangle and a short spring support groove 316a continuing from the long spring support groove 314a along one short side of the rectangle. The long and short spring support grooves 314a, 316a are configured such that when the slide rail assembly 100a is deflected beyond a predetermined amount, the torsion spring 142a contacts at least one point on the surface of the long and short spring support grooves 314a, 316a.

Figure 24:
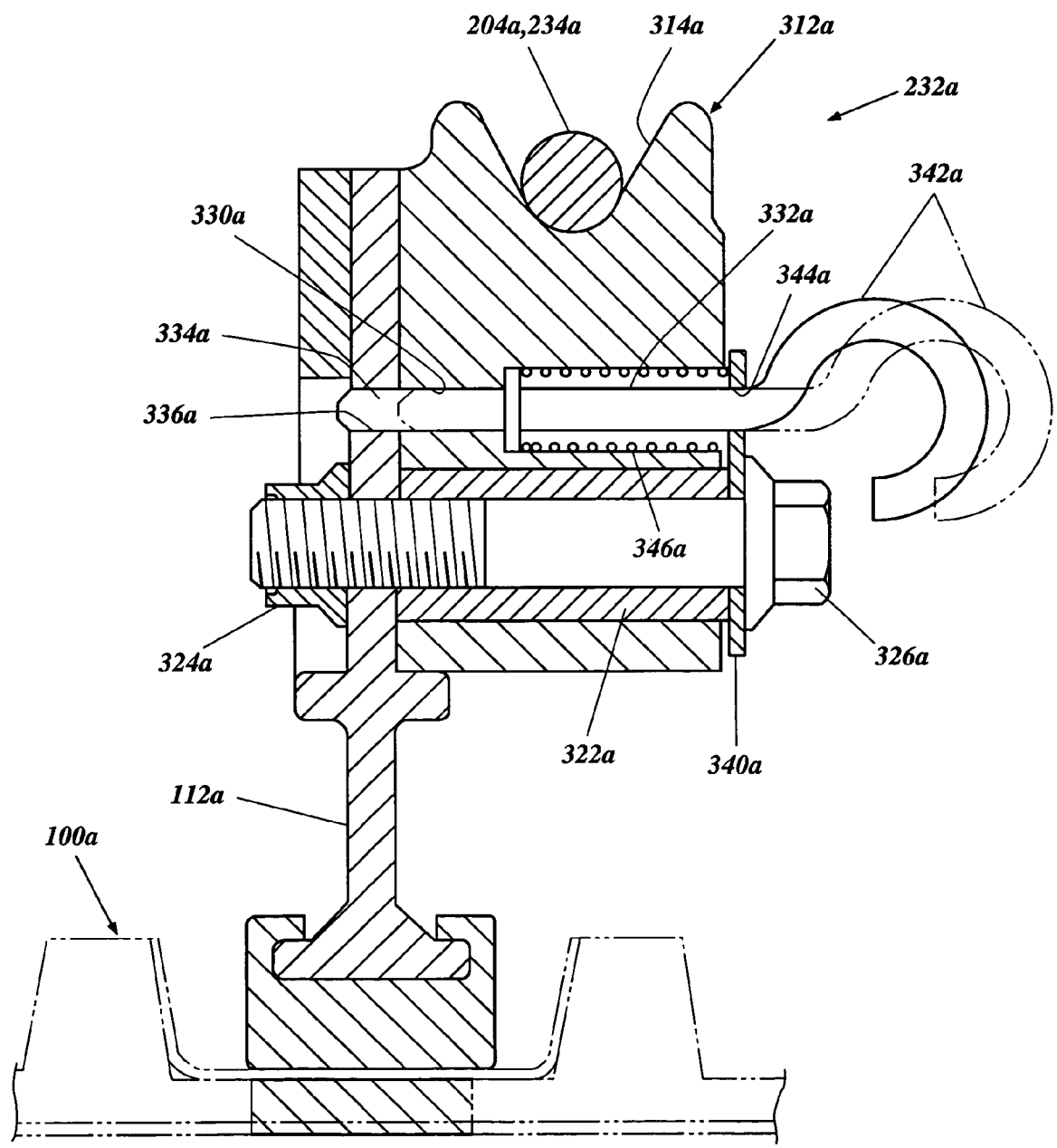
FIG. 24 is a sectional front view of a spring support member of the suspension system shown in FIG. 22.
Figure 25:
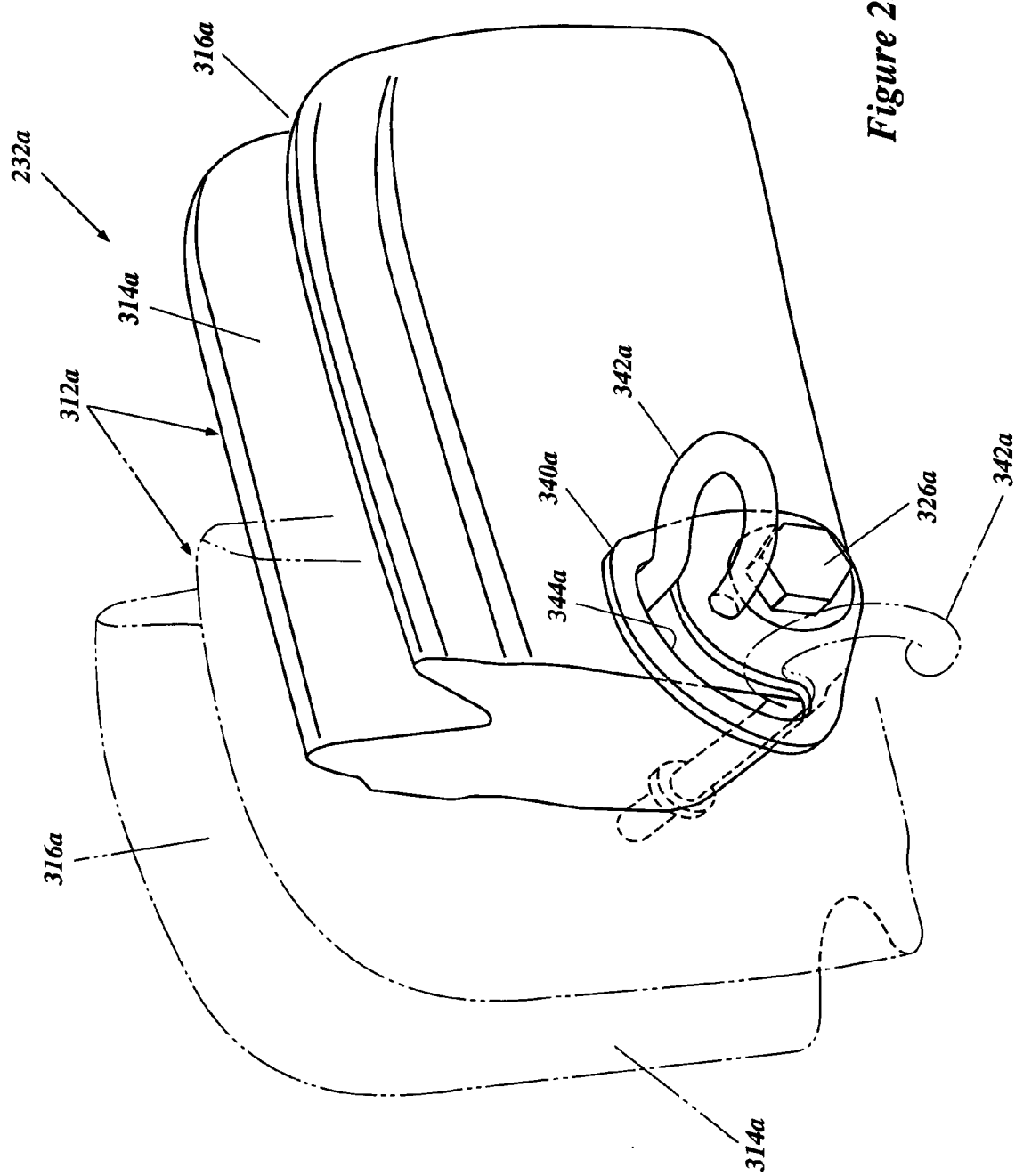
FIG. 25 is a perspective view of the spring support member of FIG. 24.

The spring support block 312a is pivotally coupled to the slide rail assembly 100a. A corner portion 320a of the spring support block 312a, located generally opposite the corner where the long and short spring support grooves meet, preferably is coupled to, and supported on, the slide rail assembly 100a such that the spring support block 312a pivots on the slide rail assembly 100a. As shown in FIG. 24, the corner portion 320a of the spring support block 312a preferably is pivotally supported on a collar 322a secured to the slide rail assembly 100a by a nut 324a and a bolt 326a.

With continued reference to FIG. 24, the spring support block 312a has a lock hole 330a and a lock pin 332a inserted in the lock hole 330a. The lock pin 332a has a distal end 334a that can protrude from, and retract into, the spring support block 312a. The lock pin 332a can engage a locator hole 336a in the slide rail assembly 100a. A guide plate 340a is disposed on the outside surface of the spring support block 312a. The guide plate 340a preferably is secured by the bolt 326a. The lock pin 332a has a base end 342a, protruding outward from an arcuate guide slot 344a formed through the guide plate 340a. The base end 342a of the lock pin 332a preferably has a hook shape to facilitate manipulation of the lock pin 332a. The lock pin 332a is biased toward the slide rail assembly 100a by a spring element 346a. The distal end 334a of the lock pin 332a preferably engages the locator hole 336a.

The spring support block 312a can be positioned in its vertical orientation (shown by solid lines in FIG. 22) when two people ride the vehicle 50a. The spring support block 312a can be rotated to its horizontal orientation (shown by broken lines in FIG. 22) when one person rides the vehicle 50a. The spring support block preferably is rotated by manually pulling the base end 342a of the lock pin 332a to overcome the biasing force of the spring element 346a. The lock pin 332a preferably is released from engagement with the slide rail assembly 100a. The lock pin 332a and spring support block 312a can be rotated to the desired vertical or horizontal orientation. When the spring support block 312a is rotated to the desired position, the spring element 346a biases the lock pin 332a into engagement with the locator hole 336a of the slide rail assembly 100a to lock the spring support block 312a in the desired position. The spring support block 312a can be easily rotated between the vertical and the horizontal orientations without the use of a tool. The spring support block 312a, in some embodiments, can also be locked in a plurality of positions between the vertical and horizontal orientations.

When two people are to ride the vehicle 50a, the spring support blocks 312a can be oriented in the vertical orientation. In the vertical orientation, the spring support blocks 312a can contact the long end portions 204a of the torsion springs 142a before the slide rail assembly 100a is ever deflected. For example, the spring support blocks 312a can contact the long end portions 204a of the torsion springs 142a when there is no load on the vehicle 50a (i.e., when nobody rides the vehicle 50a). Thus, the corresponding spring reaction curve is represented by the dot-dashed line of FIG. 23. Orienting the spring support block 312a in the vertical orientation increases the spring reaction. Accordingly the suspension system is better able to support a larger load, such a that created when two people ride the vehicle. Additionally, changing the orientation of the spring support block acts to shift the load balance more toward the rear of the vehicle 50a.

When one person is to ride the vehicle 50a, the spring support blocks 312a are oriented in the horizontal orientation. In this position, the spring support blocks 312a contact the long end portions 204a of the torsion springs 142a at intermediate spring support locations 234a when the deflection of the slide rail assembly 100a is greater than a prescribed amount. In some embodiments, the prescribed amount preferably is a point relatively close to the point of maximum deflection of the slide rail assembly 100a. In such embodiments, the corresponding spring reaction curve is represented by the solid line of FIG. 23. In such cases, the spring reaction is small enough during most of the deflection range of the slide rail assembly 100a to provide a relatively flexible suspension system 62a to provide for a comfortable ride. As the deflection of the slide rail assembly 100a reaches a point close to the maximum deflection of the slide rail assembly 100a, the spring reaction sharply increases to inhibit bottoming-out.

With reference to FIGS. 1-21, in one embodiment, the front and rear shock absorbers 134, 136 are connected to the linkage mechanism 140. With reference to FIG. 22, in another embodiment only the front shock absorber 134a is coupled to the linkage mechanism 140a. In embodiment illustrated in FIG. 22, the first linkage member 194a is coupled to the front shock absorber 134a. The second linkage member 196a is coupled to the front suspension arm 130a. A third linkage member 200a couples the first and second linkage members 194a, 196a. In the embodiment shown in FIG. 22, the rear shock absorber 136a is coupled to the slide rail assembly 100a independent of the linkage system 140a.

Figure 26:
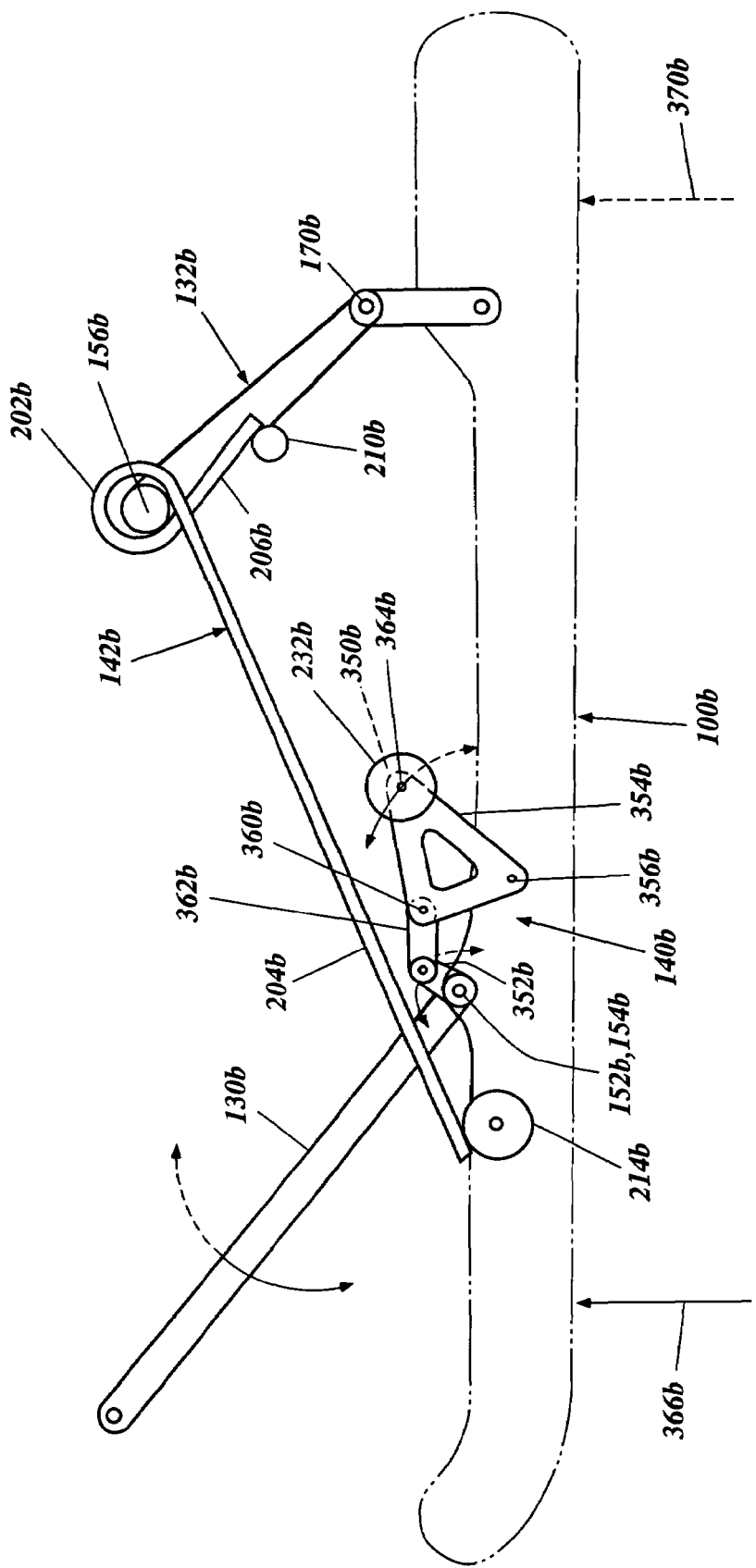
FIG. 26 is a schematic view of a suspension system according to an additional embodiment.
Figure 27A:
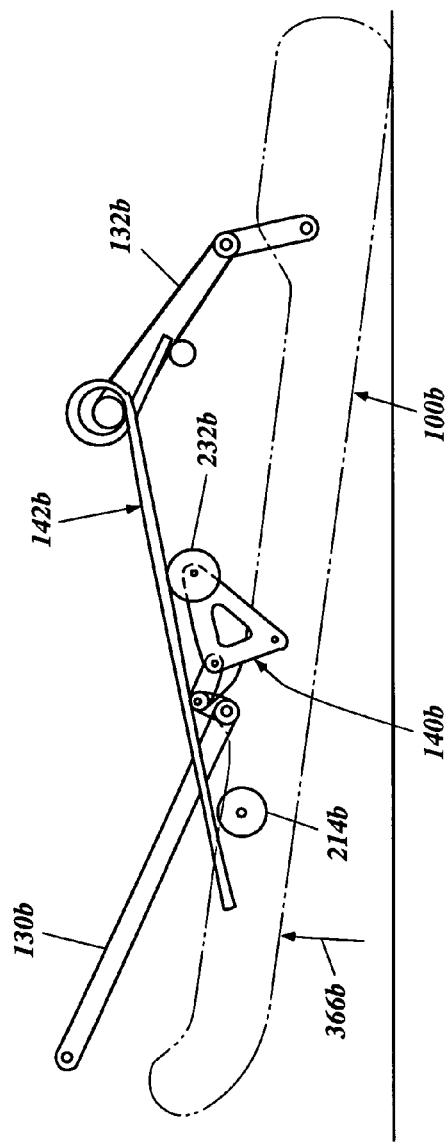
FIGS. 27(a) and 27(b) are schematic views showing the operations and effects of the suspension system of FIG. 26.
Figure 27B:
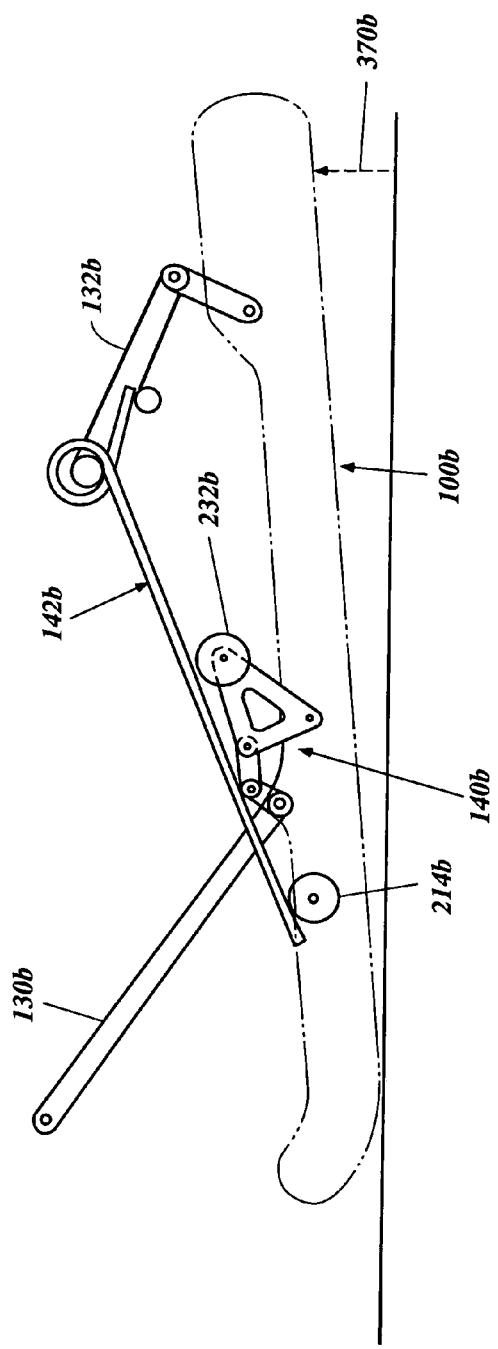

FIGS. 26, 27(a), and 27(b) are schematic views of still another embodiment. The same reference numerals used in connection with FIGS. 3 and 12 will be used to designate the same or corresponding parts in FIGS. 26, 27(a), and 27(b) except that the suffix letter "b" will be added. FIG. 26 shows, a spring support member 232b, shaped like a pulley or bobbin, having a groove 350b for supporting the torsion spring 142b. The spring support member 232b is attached to the slide rail assembly 100b via a linkage mechanism 140b. The linkage mechanism 140b automatically changes the position of the spring support member 232b relative to the slide rail assembly 100b when the slide rail assembly 100b is deflected.

The linkage mechanism 140b comprises a driving arm 352b fixed to the lower arm shaft 152b of front suspension arm 130b. The driving arm 352b is pivotally coupled at the front rail coupling location 154b. The driving arm 352b is rotatable with the front suspension arm 130b about the front rail coupling location 154b. A triangular linkage plate 354b has a first vertex 356b pivotally coupled to, and supported by, the slide rail assembly 100b. A second vertex 360b of the triangular linkage plate 354b is pivotally coupled to the driving arm 352b via an intermediate linkage member 362b. The spring support member 232b is rotatably supported at a third vertex 364b of the triangular linkage plate 354b.

When the front suspension arm 130b is rotated in a counterclockwise direction, as shown by the solid line arrow in FIG. 26, the triangular linkage plate 354b is also rotated in the counterclockwise direction. When the front suspension arm 130b is rotated in a clockwise direction, as shown by the dashed line arrow in FIG. 26, the triangular linkage plate 354b is also rotated in the clockwise direction.

With reference to FIG. 27(a), as a front portion of the slide rail assembly 100b is deflected upward by a force 366b, the front suspension arm 130b is rotated in the counterclockwise direction. The driving arm 352b and the triangular linkage plate 354b of the linkage mechanism 140b are also rotated counterclockwise. The spring support member 232b is rotated toward the long end portion 204b of the torsion spring 142b. As a result, when a force 366b is applied to a front part of the slide rail assembly 100b, the spring support members 232b contact the long end portions 204b of the torsion springs 142b relatively early to increase the spring reaction.

With reference to FIG. 27(b), when a rear portion of the slide rail assembly 100b is deflected upward by a force 370b, the front suspension arm 130b is rotated in the clockwise direction. The driving arm 352*b* and the triangular linkage plate 354*b* of the linkage mechanism 140*b* are also rotated clockwise. The spring support member 232*b* is rotated away from the torsion spring 142*b*. As a result, when a force 370*b* is applied to a rear part of the slide rail assembly 10*b*, the spring support members 232*b* contact the long end portions 204*b* of the torsion springs 142*b* relatively late.

As described above, the spring support member 232*b* is rotated by the linkage mechanism 140*b* to automatically change the position of the spring support member 232*b* relative to the slide rail assembly 100*b* depending on the deflection of the slide rail assembly 100*b*. The operation conditions of the spring support member 232*b* can be controlled by properly selecting the size and arrangement of the component parts of the linkage mechanism 140*b*. Additionally, the angles of deflection of the springs are relatively small compared with some known vehicles, thereby minimizing spring stress that otherwise may be generated in the torsion springs.

Figure 28A:
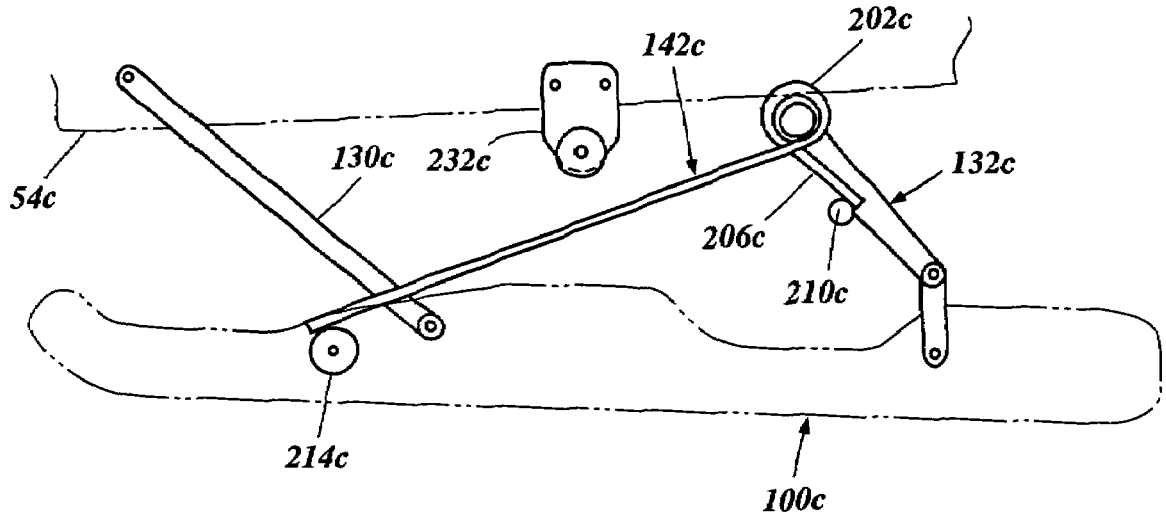
FIGS. 28(a), 28(b), and 28(c) are schematic views of a suspension system according to a further embodiment.
Figure 28B:
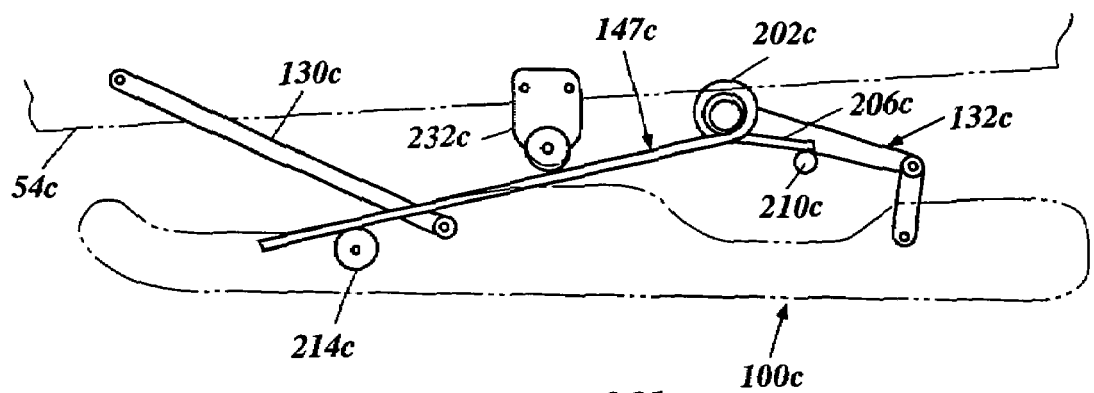
Figure 28C:
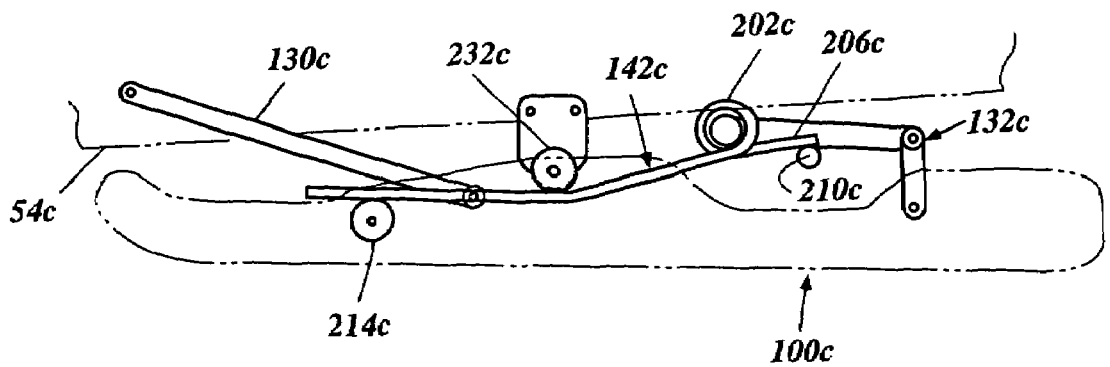

FIGS. 28(*a*), 28(*b*), and 28(*c*) are schematic views of yet another embodiment. The same reference numerals used in connection with FIGS. 3, 12, and 26 will be used to designate the same or corresponding parts in FIGS. 28(*a*), 28(*b*), and 28(*c*), except that the suffix letter "c" will be added. A spring support member 232*c* is provided on a side of the body frame 54*c*. As shown in FIG. 28(*a*), in an initial deflection range, where the deflection of the slide rail assembly 100*c* is not greater than a prescribed amount, the long end portion 204*c* of the torsion spring 142*c* does not contact the spring support member 232*c*. As shown in FIG. 28(*b*), when the deflection of the slide rail assembly 100*c* reaches the prescribed amount, the long end portion 204*c* of the torsion spring 142*c* contacts the spring support portion 232*c*. With reference to FIG. 28(*c*), as the deflection of the slide rail assembly 100*c* increases beyond the prescribed amount, the long end portion 204*c* of the torsion spring 142*c* is pressed against the spring support portion 232*c* at an intermediate spring support location 234*c*. The long end portion 204*c* of the torsion spring 142*c* is elastically deformed. An end 212*c* of the long end portion 204*c* is supported at a first spring support location 218*c* toward the front of the vehicle 50*c* and an intermediate portion of the long end portion 204*c* is supported at the intermediate spring support location 234*c*.

Spring support members 232*c* can be provided on both sides of the body frame 54*c*. By locating the spring support member 232*c* on the body frame 54*c* rather than on the slide rail assembly 100*c*, the weight of the slide rail assembly 100*c* is relatively lighter. Reducing the weight of the slide rail assembly 100*c* improves the responsiveness of the suspension system 62*c* as a whole. Additionally, the angles of deflection of the springs are relatively small compared with some known vehicles, thereby minimizing spring stress that otherwise may be generated in the torsion springs.

As the slide rail assembly 100*c* deflects beyond the prescribed amount, intermediate portions of the long end portions 204*c* of the torsion springs 142*c* are pressed against the spring support members 232*c* so that the long end portions 204*c* are elastically deformed. The spring reaction characteristic of the illustrated embodiment can be different from the spring reaction characteristics related to other embodiments because the long end portion 204*c* is supported at the end 212*c* and at the intermediate spring support location 234*c* simultaneously.

FIGS. 29-33 illustrate another embodiment. The same reference numerals used in connection with FIGS. 22-25 will be used to designate the same or corresponding parts in FIGS. 29-33, except that the suffix letter "d" will be added. A spring support member 232*d* is configured to support a long end portion 204*d* of the torsion spring 142*d* at an intermediate spring support location 234*d*. The spring support member 232*d* is coupled to the slide rail assembly 100*d*. The spring support member 232*d* preferably is slidable in the longitudinal direction of the vehicle 50*d*. The spring support member 232*d* preferably is rotatable about a support shaft 372*d*. When the spring support member 232*d* is slidably positioned in a first configuration relative the support shaft 372*d*, the spring support member 232*d* can be rotated rearward. When the spring support member 232*d* is slidably positioned in a second configuration relative the support shaft 372*d*, the spring support member 232*d* can be rotated forward.

Figure 30:
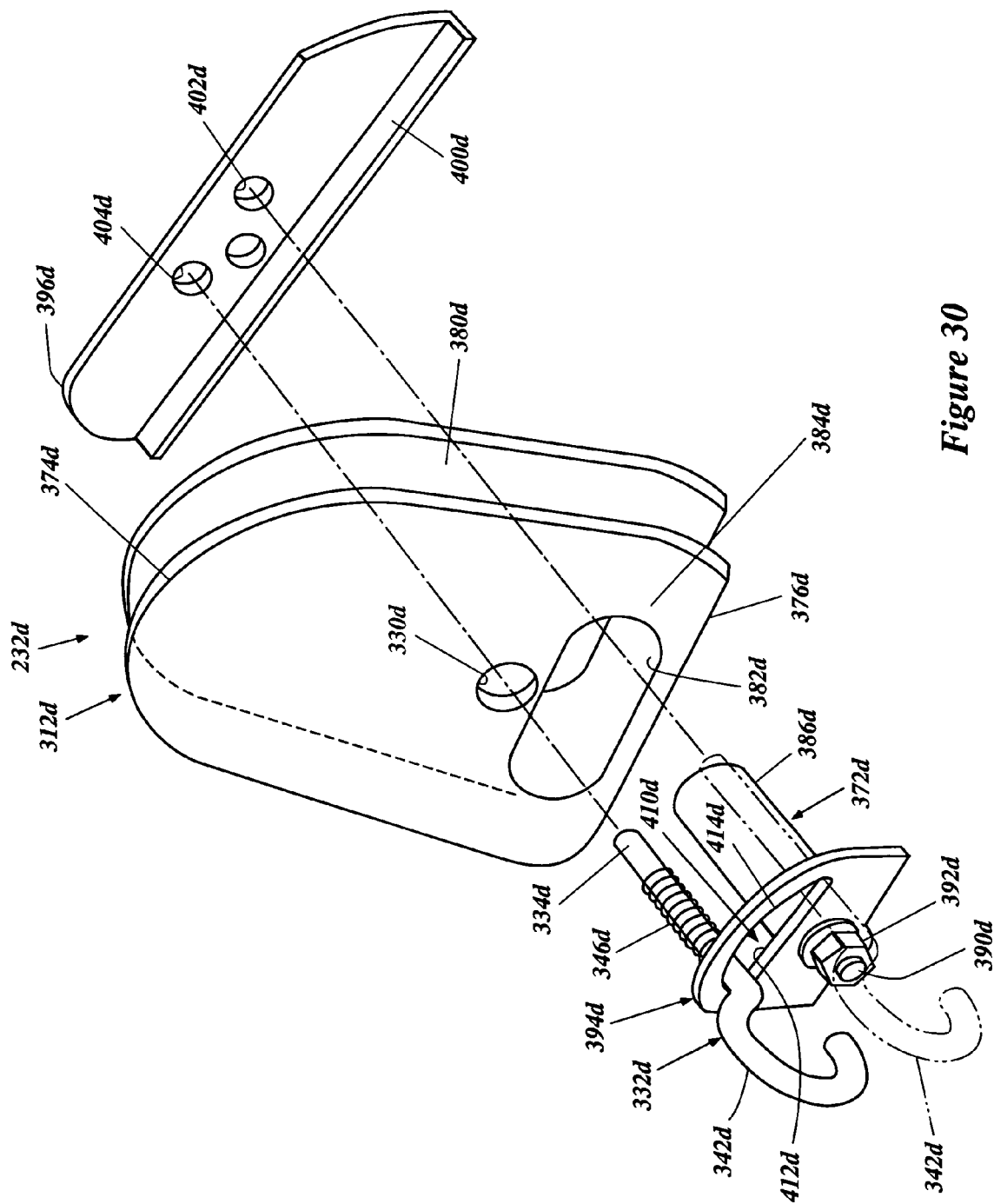
FIG. 30 is an exploded perspective view of the spring support member of FIG. 29.

With reference to FIG. 30, the spring support member 232*d* has a spring support block 312*d*. The spring support block 312*d* preferably is made of aluminum alloy or other suitable material. The spring support block 312*d* preferably is generally plate shaped. The spring support block 312*d* preferably has a curved edge portion 374*d* and a generally flat base 376*d*. The spring support block 312*d* has a spring support groove 380*d* formed along the curved edge portion 374*d* of the spring support block 312*d*. The spring support groove 380*d* is configured to abut the long end portion 204*d* of the torsion spring 142*d*.

A slot 382*d* is formed in a base portion 384*d* of the spring support block 312*d*. The slot 382*d* extends generally along the flat base 376*d* of the spring support block 312*d*. The support shaft 372*d* extends through the slot 382*d* to fasten the spring support block 312*d* to the slide rail assembly 100*d*. The support shaft 372*d* comprises a collar 386*d*, a bolt 390*d* and a nut 392*d*. A guide plate 394*d* is interposed between an end of the collar 386*d* and the nut 392*d*. A block support plate 396*d* is interposed between the other end of the collar 386*d* and the slide rail assembly 10*d*.

Figure 31:
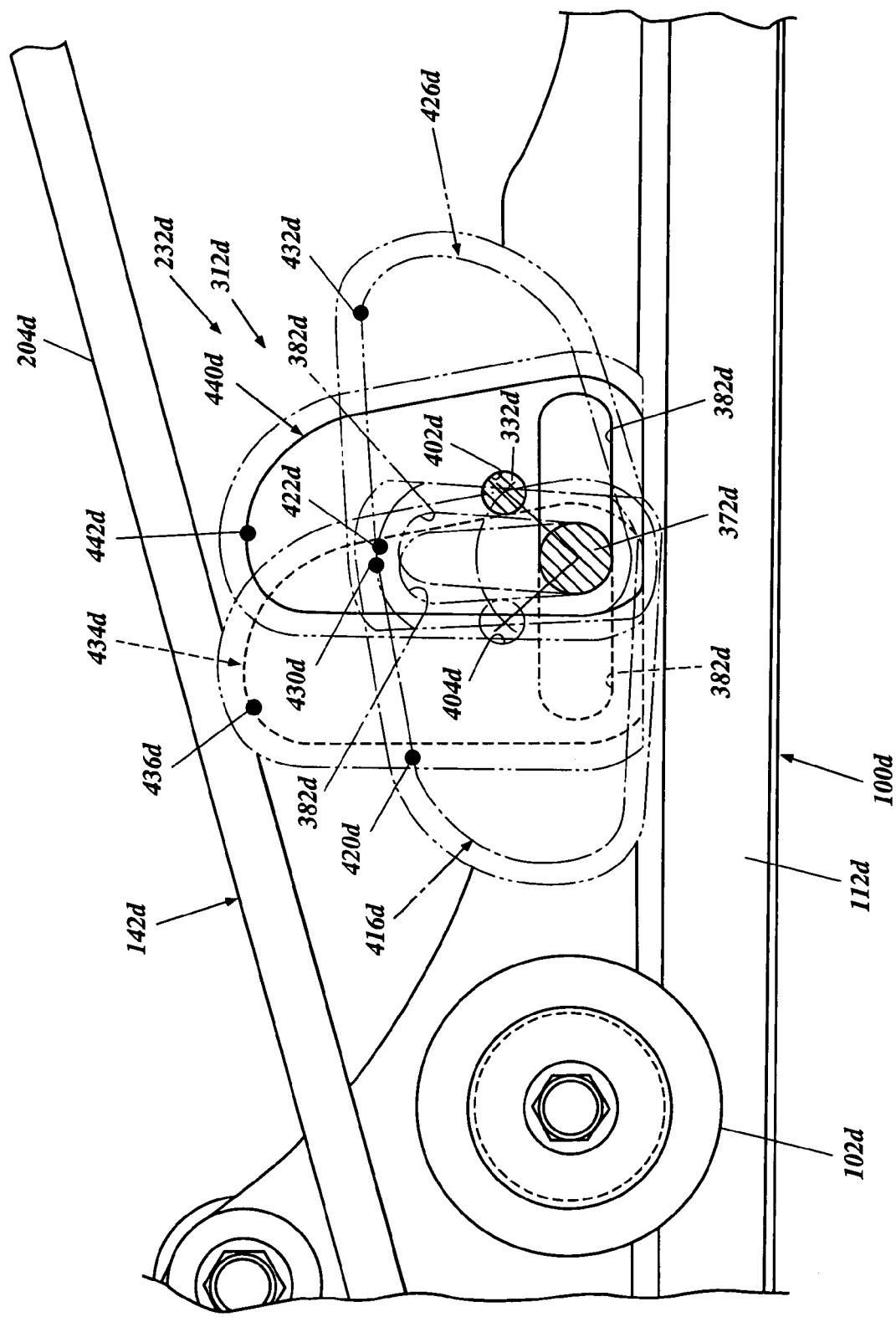
FIG. 31 is a schematic view showing the operations of the spring support member of FIG. 29.

With reference to FIG. 31, when the spring support block 312*d* is vertically oriented, the slot 382*d* defined in the spring support block 312*d* is horizontally oriented. In the vertical orientation, the spring support block 312*d* is slidable over the support shaft 372*d* in the longitudinal direction. The spring support block 312*d* can slide for a distance corresponding to the length of the slot 382*d*. The spring support block 312*d* slides along a base 400*d* of the block support plate 396*d*. As the spring support block 312*d* slides, the position of the collar 386*d* relative the ends of the slot 382*d* of the spring support block 312*d* changes.

With reference to FIG. 32(*a*), the spring support block 312*d* is vertically oriented and moved to a foremost position. The base position 384*d* of the spring support block 312*d* is supported on the base 400*d* of the block support plate 396*d*. From the position illustrated in FIG. 32(*a*), with the support shaft 372*d* in the rearmost position relative the slot 382*d*, the spring support block 312*d* is rotatable around the support shaft 372*d* to a rear lying position as shown in FIG. 32(*b*). With reference to FIG. 32(*c*), the spring support block 312*d* is moved to a rearmost position. From the position illustrated in FIG. 32(*c*), with the support shaft 372*d* in the foremost position relative the slot 382*d*, the spring support block 312*d* is rotatable around the support shaft 372*d* to a front lying position as shown in FIG. 32(*d*).

Figure 29:
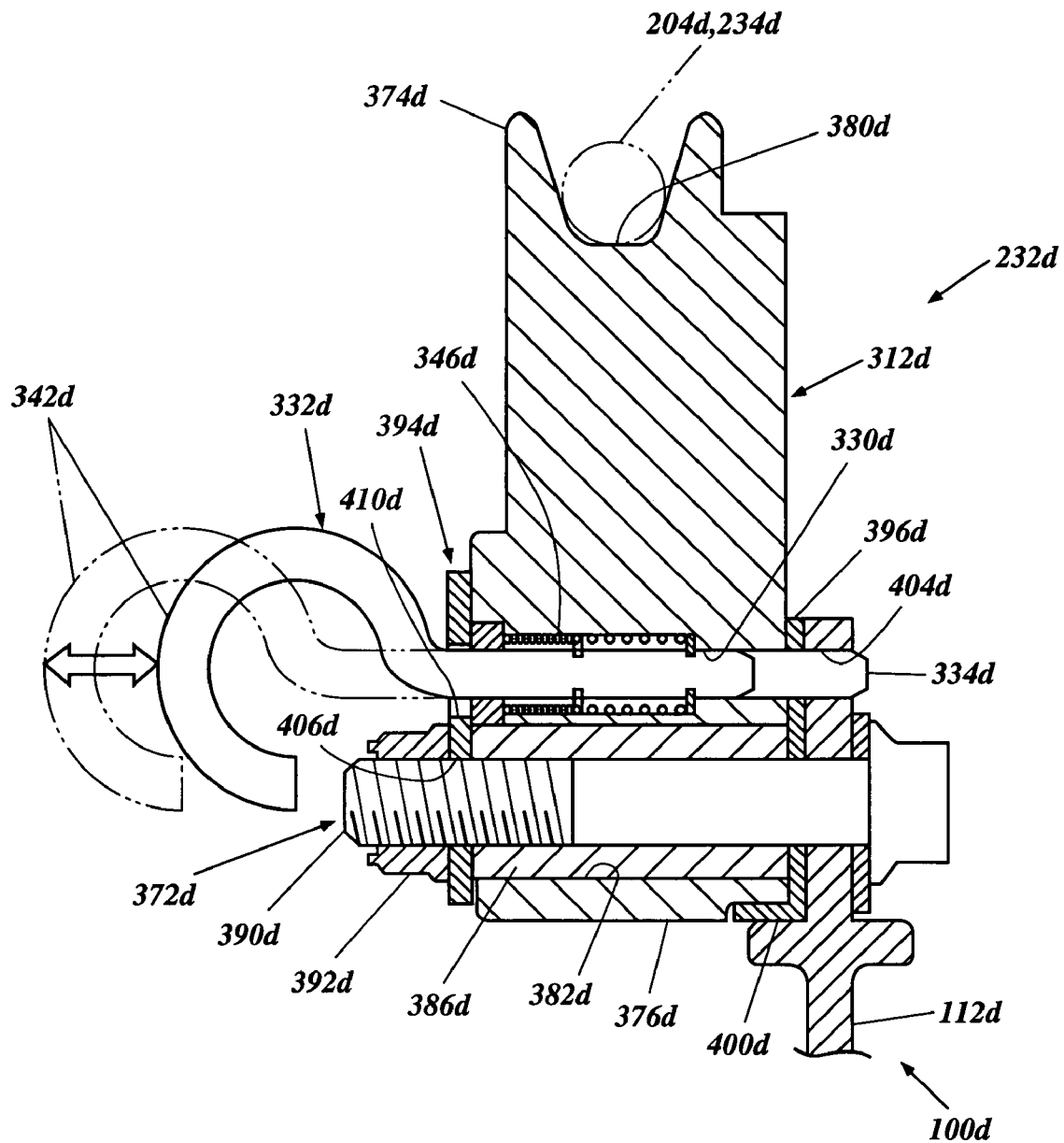
FIG. 29 is a sectional front view of a spring support member of a suspension system according to another embodiment.

As shown in FIG. 29, the spring support block 312*d* has a lock hole 330*d* and a lock pin 332*d*. The lock pin 332*d* is inserted in the lock hole 330*d* and is slidable along its axial direction. The lock pin 332*d* has a base end 342*d* having a hook shape to facilitate manipulation of the lock pin 332*d*. The lock pin 332*d* has a distal end 334*d* that can protrude from, and retract into, the spring support block 312d. The lock pin 332d is engageable in one of a plurality of locator holes 402d, 404d formed in the slide rail assembly 100d and in the block support plate 396d. The lock pin 332d is biased toward the locator hole 404d by a spring element 346d. The distal end 334d of the lock pin 332d engages the one of the plurality of locator holes 402d, 404d.

Figure 32A:
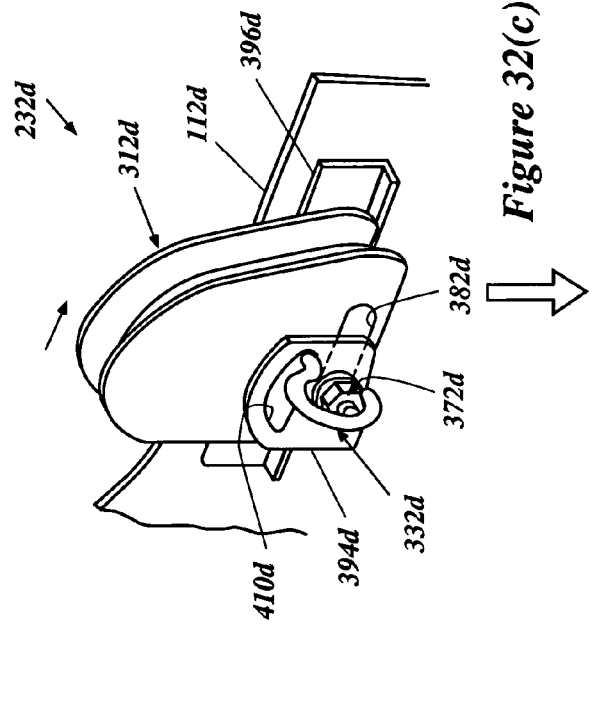
FIGS. 32(a), 32(b), 32(c), and 32(d) are perspective views showing the operations of the spring support member of FIG. 29.
Figure 32C:
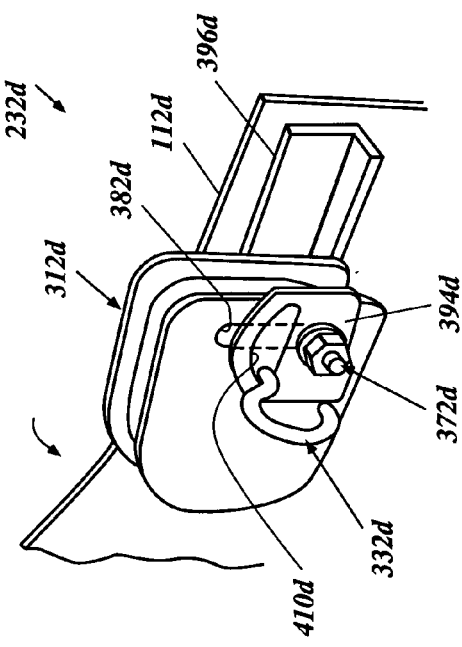
Figure 32B:
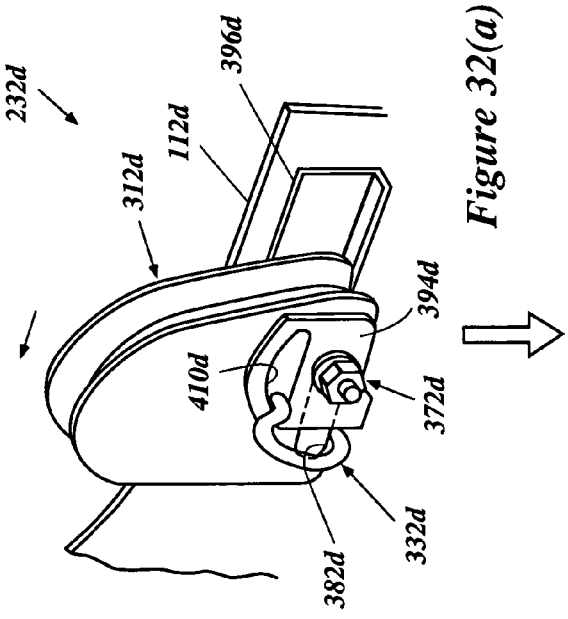

With reference to FIGS. 30-32, when the spring support block 312d is in either the rearmost vertically oriented position (FIG. 32(c)), or in the rear lying position (FIG. 32(b)), the lock pin 332d is engaged with the rear locator hole 402d. When the spring support block 312d is in either the foremost vertically oriented position (FIG. 32(a)), or in the front lying position (FIG. 32(d)), the lock pin 332d is engaged with the front locator hole 404d.

As shown in FIGS. 29, 30 and 32, the guide plate 394d disposed on the outer side of the spring support block 312d has a bolt hole 406d through which the bolt 390d is inserted. The guide plate 394d has a guide opening 410d through which the lock pin 332d is inserted. The guide opening 410d has a generally flat lower edge 412d and an arcuate upper edge 414d. The generally flat lower edge 412d permits the lock pin 332d to slide relative the guide plate 394d. The arcuate upper edge 414d permits the lock pin 332d to rotate relative the support shaft 372d.

Figure 32D:
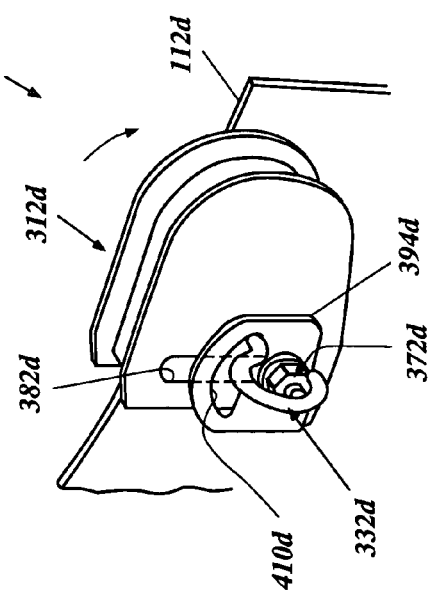
Figure 33:
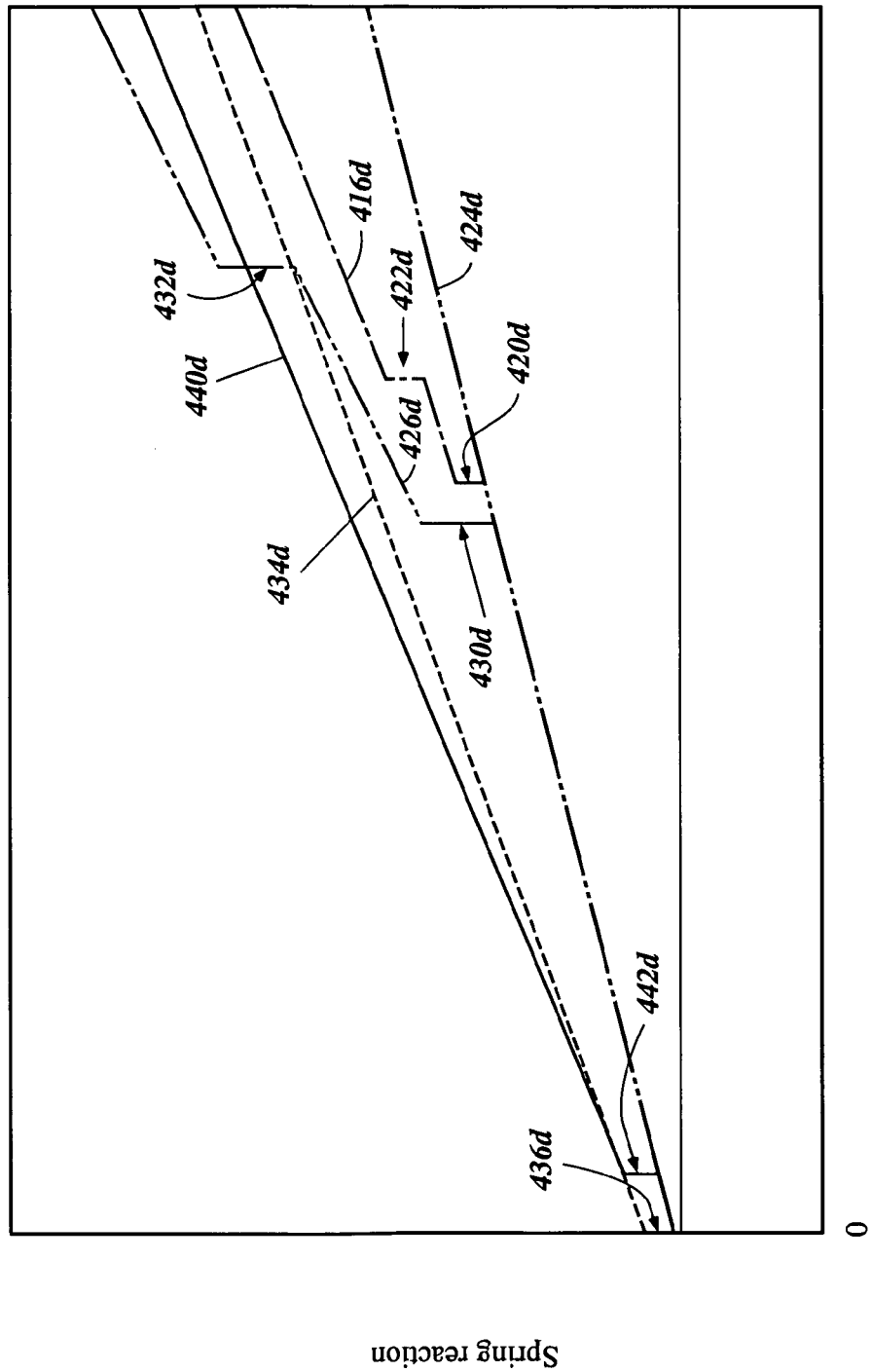
FIG. 33 is a graph of a curve showing the relationship between spring reaction force versus slide rail deflection for the embodiment of FIG. 29.

When a relatively flexible suspension system 62d is desired, for example, with one person riding the vehicle 50d, the spring support block 312d can be rotated to the front lying position as shown by a single dot-dashed line 416d in FIG. 31 (see FIG. 32(d)). The spring reaction characteristic relative the slide rail assembly 100d deflection is illustrated in FIG. 33 by the dot-dashed line 416d. As the deflection of the slide rail assembly 100d increases, the torsion spring 142d contacts the spring support block 312d at a first contact point 420d. When the deflection further increases, the torsion spring 142d contacts the spring support block 312d at a second contact point 422d. Accordingly, the spring reaction is increased slightly more than when no spring support member 232d is provided. The spring reaction characteristic relative the slide rail assembly 100d deflection when no spring support member 232d is provided is illustrated in FIG. 33 by the triple dashed line 424d.

When a relatively stiffer suspension system 62d is desired, for example, with one person riding the vehicle 50d, the spring support block 312d is rotated to the rear lying position as shown by a double dot-dashed line 426d in FIG. 31 (see FIG. 32(b)). The spring reaction characteristic relative the slide rail assembly 100d deflection is illustrated in FIG. 33 by the double dot-dashed line 426d. As the deflection of the slide rail assembly 100d increases, the torsion spring 142d contacts the spring support block 312d at a third contact point 430d. When the deflection further increases, the torsion spring 142d contacts the spring support block 312d at a fourth contact point 432d. Accordingly, the spring reaction is increased more than when the spring support block 312d is rotated to the front lying position. Accordingly a relatively stiffer suspension 62d is obtained.

When a relatively flexible suspension system 62d is desired, for example, with two people riding the vehicle 50d (preferably when the rider in the rear is a relatively light person, such as a child), the spring support block 312d is rotated to the foremost vertical orientation as shown by a broken line 434d in FIG. 31 (see FIG. 32(a)). The spring reaction characteristic relative the slide rail assembly 100d deflection is illustrated in FIG. 33 by the broken line 434d. The torsion spring 142d contacts the spring support block 312d at a fifth contact point 436d without any deflection of the slide rail assembly 100d. When slide rail assembly 100d deflects, the torsion spring 142d still contacts the spring support block 312d at the fifth contact point 436d. The corresponding initial spring reaction is larger than when the spring support block 312d is oriented in the front or rear lying positions. Accordingly, the spring reaction is increased, and exhibits a slightly greater inclination, compared to when no spring support member 232d is provided, as illustrated in FIG. 33 by the triple dashed line 424d. Accordingly, the suspension system 62d is stiffer than when no spring support member 232d is provided, and yet relatively flexible considering that two people are riding the vehicle 50d.

When a relatively stiff suspension system 62d is desired, for example, with two people riding the vehicle 50d (preferably when the rider in the rear is a relatively heavy person, such as an adult), the spring support block 312d is rotated to the rearmost vertical orientation as shown by a solid line 440d in FIG. 31 (see FIG. 32(c)). The spring reaction characteristic relative the slide rail assembly 100d deflection is illustrated in FIG. 33 by the solid line 440d. As the deflection of the slide rail assembly 100d increases slightly, the torsion spring 142d contacts the spring support block 312d at a sixth contact point 442d. When the torsion spring 142d contacts at the sixth contact point 442d, the spring reaction increases approximately as much as when the spring support block 312d is rotated to the foremost vertical orientation. When slide rail assembly 100d deflects further, the torsion spring 142d still contacts the spring support block 312d at the sixth contact point 442d. As the deflection increases, the spring reaction is increased, and exhibits a slightly greater inclination, compared to when the spring support block 312d is rotated to the foremost vertical orientation. Accordingly, the suspension system 62d as a whole is relatively stiffer than when the spring support block 312d is rotated to the foremost vertical orientation.

The spring support member 232d can be unlocked by manually pulling the base 342d of the lock pin 332d, against the biasing force of the spring element 346d, to release the lock pin 332d from engagement with the slide rail assembly 100d. The spring support member 232d can be adjusted by sliding and/or rotating the lock pin 332d in the longitudinal direction. When the spring support member 232d is positioned in a desired orientation the lock pin 332d is released. The lock pin 332d engages one of the locator holes 402d, 404d of the slide rail assembly 100d to lock the spring support member 232d in the desired orientation. The spring support blocks 312d may be locked in a plurality of positions between the front and rear positions.

The spring support block 312d can slide in the longitudinal direction and rotate forward or rearward when the spring support block 312d is positioned in its rearmost and foremost positions, respectively. Thus, the relative position of the spring support member 232d can be changed through a wide range. Accordingly, the spring reaction characteristic can be adjusted depending upon the user's preference. The spring support member 232d has a relatively simple structure and is relatively simple to operate.

Figure 34:
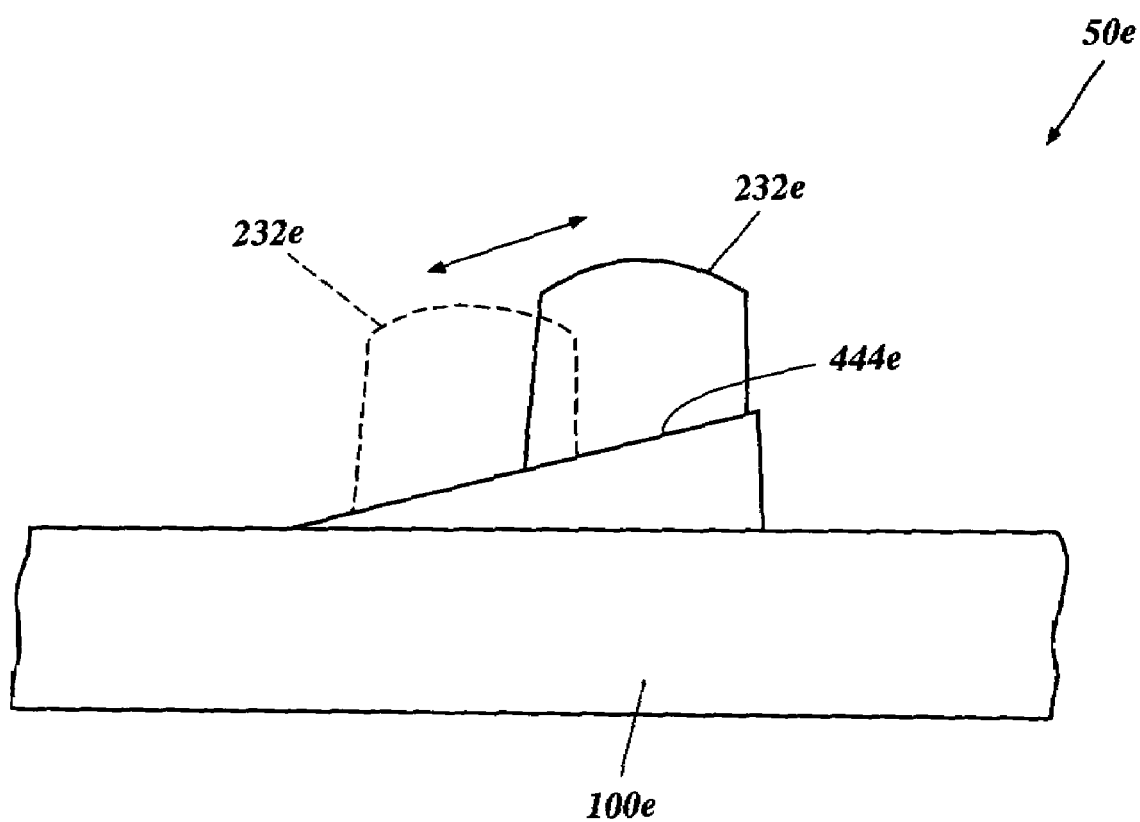
FIG. 34 is a schematic view of a spring support member of a suspension system according to another embodiment.
Figure 35:
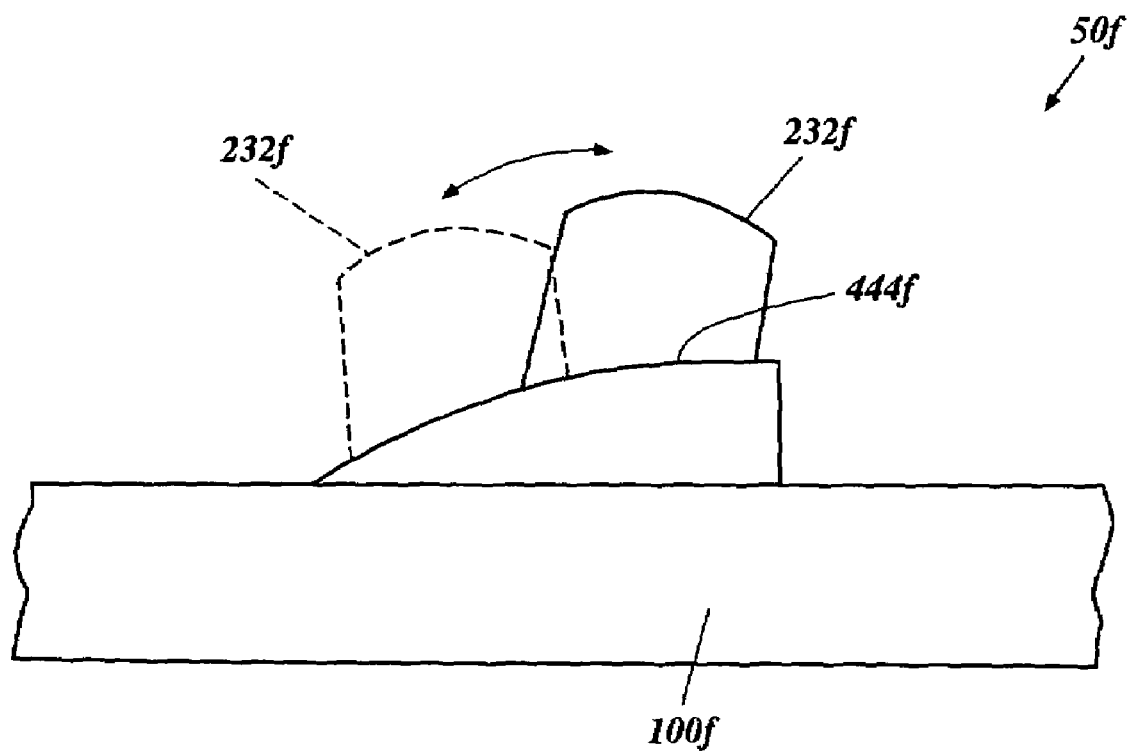
FIG. 35 is a schematic view of a spring support member of a suspension system according to an additional embodiment.
Figure 36:
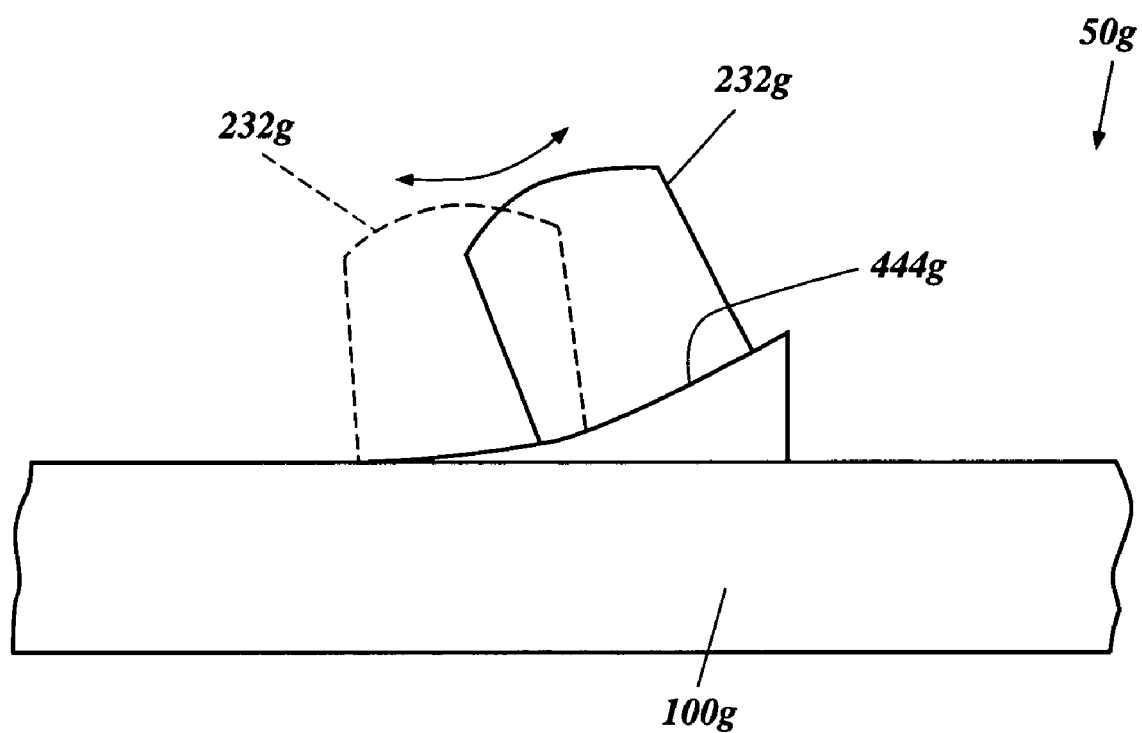
FIG. 36 is a schematic view of a spring support member of a suspension system according to a further embodiment.

FIGS. 34, 35, and 36 illustrate other embodiments in which the relative position of a spring support member is changed. The same reference numerals used in connection with the previous figures will be used to designate the same or corresponding parts in FIGS. 34, 35, and 36, except that one of the suffix letters "e," "f," and "g" will be added, respectively. With reference to FIG. 34, in one embodiment, a spring support member 232e is slidably coupled to a straight inclined surface 444e formed on a slide rail assembly 10e. The inclined surface 444e is higher toward the rear of the vehicle 150e. In other embodiments, the inclined surface 444e can be higher toward the front of the vehicle 50e. Since the spring support member 232e can slide along the straight inclined surface 444e, the position of the spring support member 232e can be changed in the longitudinal direction and in the vertical direction at the same time, while the angle of the spring support member 232e relative to the slide rail assembly 110e is kept constant.

With reference to FIG. 35, in one embodiment, a spring support member 232f is slidably coupled to a curved inclined surface 444f formed on a slide rail assembly 10f. The inclined surface 444f is higher toward the rear of the vehicle 50f. In other embodiments, the inclined surface 444f can be higher toward the front of the vehicle 50f. Since the inclined surface 444f is convex, the position of the spring support member 232f can be changed in the longitudinal direction and in the vertical direction while the angle of the spring support member 232f relative to the slide rail assembly 100f can be varied. Accordingly, the spring reaction characteristic can be varied through a wide range.

As shown in FIG. 36, in one embodiment, a spring support member 232g is slidably coupled to a curved inclined surface 444g formed on a slide rail assembly 100g. The inclined surface 444g is higher toward the rear of the vehicle 50g. In other embodiments, the inclined surface 444g can be higher toward the front of the vehicle 50g. Since the inclined surface 444g is concave, the position of the spring support member 232g can be changed in the longitudinal direction and in the vertical direction while the angle of the spring support member 232g relative to the slide rail assembly 100g can be varied. Accordingly, the spring reaction characteristic can be varied through a wide range.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present vehicle suspension system has been described in the context of particularly preferred embodiments, the skilled artisan will appreciate, in view of the present disclosure, that certain advantages, features and aspects of the suspension system may be realized in a variety of other applications, many of which have been noted above. For example, while particularly useful for snow vehicle suspension systems, the skilled artisan can readily adopt the principles and advantages described herein to a variety of other applications, including larger scale devices. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims that follow.

What is claimed is:

1. A vehicle comprising:
   a frame having a longitudinal axis;
   a slide rail disposed below the frame for guiding a drive track along a road surface, the slide rail being pivotally coupled to the frame;
   a spring member for urging the slide rail in a direction away from the frame, the spring member having a first portion mounted to the frame and a second portion supported on the slide rail at a first spring support position in a first configuration; and
   at least first and second spring supports, the first spring support coupled to the vehicle at the first spring support position and the second spring support coupled to the vehicle at a second spring support position which is distanced from the first spring support position in a longitudinal direction, the second spring support being arranged to engage the spring member upon deflection of the slide rail such that the spring member is supported by the second spring support at the second spring support position in a second configuration, the second spring support being spaced from the first spring support such that deflection of the slide rail produces a non-linear spring reaction force.

2. The vehicle of claim 1, wherein the spring member is a torsion spring.

3. The vehicle of claim 1, wherein the spring member is a plate spring.

4. The vehicle of claim 1, wherein a length of the spring member between the first portion and a point of contact at the first spring support position is longer than a length of the spring member between the first portion and a point of contact at the second spring support position.

5. The vehicle of claim 1, wherein the spring member is attachable to, and removable from, the slide rail.

6. The vehicle of claim 1, wherein the spring member is adjustable in a vertical direction relative the slide rail.

7. The vehicle of claim 1, wherein the spring member is adjustable in a longitudinal direction relative the slide rail.

8. The vehicle of claim 1 additionally comprising at least another spring support.

9. The vehicle of claim 1, wherein the second spring support comprises a cam surface and is adjustable between at least a first position and a second position relative to the slide rail, the second spring support in the first position is configured to contact the spring member in a relatively earlier stage of upward movement of the slide rail, and the second spring support in the second position is configured to contact the spring member in a relatively later stage of upward movement of the slide rail.

10. The vehicle of claim 1, wherein the second spring support is attached to the slide rail via a linkage mechanism such that the position of the second spring support relative to the slide rail is changed when the slide rail is moved upward.

11. The vehicle of claim 1, wherein the second spring support is coupled to the slide rail at the second spring support position.

12. The vehicle of claim 1, wherein the second spring support is coupled to the frame at the second spring support position.

13. The vehicle of claim 1, wherein at least one of the first and second spring supports is coupled to the slide rail so as to be slidable in a generally longitudinal direction.

14. The vehicle of claim 13, wherein at least one of the first and second spring supports has an opening extending generally in a longitudinal direction, a support shaft extends through said opening and is coupled to the slide rail, and the spring support is slidable over the support shaft in the generally longitudinal direction.

15. The vehicle of claim 14, wherein at least one of the first and second spring supports is rotatable in a forward direction around the support shaft when the support shaft is positioned in a foremost position in the opening.

16. The vehicle of claim 14, wherein at least one of the first and second spring supports is rotatable in a rearward direction around the support shaft when the support shaft is positioned in a rearmost position in the opening.

17. The vehicle of claim 13, wherein at least one of the first and second spring supports is slidable along an inclined surface formed on the slide rail.

18. The vehicle of claim 17, wherein the inclined surface is linear.

19. The vehicle of claim 17, wherein the inclined surface becomes higher toward a rear of the vehicle.

20. The vehicle of claim 17, wherein the inclined surface becomes higher toward a front of the vehicle.

21. The vehicle of claim 17, wherein the inclined surface is curved.

22. The vehicle of claim 21, wherein the inclined surface is concave.

23. The vehicle of claim 21, wherein the inclined surface is convex.

24. The vehicle of claim 1, wherein at least one of the first and second spring supports is attachable to, and removable from, the slide rail.

25. The vehicle of claim 1, wherein at least one of the first and second spring supports is adjustable in a vertical direction relative the slide rail.

26. The vehicle of claim 1, wherein at least one of the first and second spring supports is adjustable in a longitudinal direction relative the slide rail.

27. The vehicle of claim 1, wherein at least one of the first and second spring supports is rotatable.

28. The vehicle of claim 27, wherein at least one of the first and second spring supports is rotatable about a first axis extending generally through a central portion of the at least one of the first and second spring supports.

29. The vehicle of claim 28, wherein at least one of the first and second spring supports is rotatable about a second axis spaced from the first axis, the second axis extending generally through the slide rail, the position of the second axis being generally fixed relative to the slide rail and the position of the first axis being movable relative to the slide rail.

30. The vehicle of claim 28, wherein the position of the first axis relative to the slide rail is generally fixed.

31. The vehicle of claim 1, wherein at least one of the first and second spring supports is generally bobbin-shaped.

32. A vehicle comprising:
a frame;
a slide rail pivotally coupled to the frame;
a torsion spring having a first portion mounted to the frame and a second portion extending from the first portion generally toward the slide rail;
a first means for supporting the second portion of the spring at a first spring support location; and
a second means for supporting the second portion of the spring at a second spring support location, wherein the second means is movable independent of said first means to support the second portion of the spring at at least a third spring support location.

33. The vehicle of claim 32, wherein the second means is generally bobbin-shaped.

34. The vehicle of claim 33, wherein the second means is rotatable.

35. A vehicle comprising:
a frame;
a slide rail pivotally coupled to the frame; and
means for producing a non-linear spring reaction force opposing motion of the slide rail toward the frame, at least a portion of said means being slidable in a generally longitudinal direction relative to the slide rail.

36. A method of operation of a vehicle having a frame, a slide rail pivotally coupled to the frame, a spring member having a first portion mounted to the frame and a second portion supported on the slide rail at a first spring support position in a first configuration, and at least one spring support coupled to the vehicle at a second spring support position and arranged to engage a third portion of the spring member upon deflection of the slide rail in a second configuration, the method comprising the steps of:
deflecting the slide rail within a first range, wherein the second portion of the spring member is supported at the first spring support position; and
deflecting the slide rail within a second range, wherein the at least one spring support engages the third portion of the spring member at the second spring support position.

37. The method of claim 36 additionally comprising:
moving the at least one spring support from the second spring support position to a third spring support position; and
deflecting the slide rail within a third range, wherein the second spring support member engages the third portion of the spring member at the third spring support position.

38. A vehicle comprising:
a frame;
a slide rail disposed below the frame for guiding a drive track along a road surface, the slide rail being pivotally coupled to the frame;
a spring member for urging the slide rail in a direction away from the frame, the spring member having a first portion mounted to the frame and a second portion supported on the slide rail at a spring support position; and
at least one spring support movably coupled to the vehicle such that pivotal movement of the slide rail relative to the frame causes the spring support to move relative to the slide rail.

39. The vehicle of claim 38, wherein the spring support is arranged to engage the spring member upon deflection of the slide rail such that the spring member is supported by the spring support such that deflection of the slide rail produces a non-linear spring reaction force response.

40. The vehicle of claim 38, wherein a linkage member movably couples the spring support to the slide rail.

41. The vehicle of claim 38, wherein movably coupling the spring support causes the spring support to move along a predefined path relative to the slide rail.

42. The vehicle of claim 38, wherein the spring support is rotatable.

* * * * *